United States Patent [19]

Iida et al.

[11] Patent Number: 5,043,965
[45] Date of Patent: Aug. 27, 1991

[54] OPTICAL APPARATUS FOR OPTICAL INFORMATION RECORDING MEDIUM

[75] Inventors: Tamotsu Iida, Tsuchiura; Hiroshi Nagate, Ikeda; Toshiaki Taii, Ibaraki; Toyoyuki Nunomura, Ibaraki; Atsuki Hirose, Ibaraki, all of Japan

[73] Assignee: Hitachi Maxell, Ltd., Osaka, Japan

[21] Appl. No.: 253,502

[22] Filed: Oct. 5, 1988

[30] Foreign Application Priority Data

Oct. 5, 1987 [JP] Japan .............................. 62-249907
Nov. 12, 1987 [JP] Japan .............................. 62-284112
Dec. 4, 1987 [JP] Japan .............................. 62-305976
Mar. 1, 1988 [JP] Japan .............................. 63-45916
Apr. 5, 1988 [JP] Japan .............................. 63-82164

[51] Int. Cl.$^5$ ...................... G11B 21/10; G11B 7/12
[52] U.S. Cl. ............................ 369/44.13; 369/116; 369/112; 369/44.14
[58] Field of Search ............ 369/116, 111, 112, 42.13, 369/42.14, 100, 97, 51, 50; 350/371, 358

[56] References Cited

U.S. PATENT DOCUMENTS 4,223,347  9/1980  Bauwhuis et al. ............... 369/44.13
4,535,431  8/1985  Bricot et al. .................... 369/44.13
4,703,408 10/1987  Yonezawa et al. .............. 369/44.13

FOREIGN PATENT DOCUMENTS 0021411  6/1980  European Pat. Off. .
0189135  1/1986  European Pat. Off. .
0190774  1/1986  European Pat. Off. .
62-177730  8/1987  Japan .
2167202  5/1986  United Kingdom ............... 369/97

OTHER PUBLICATIONS

Y. Okino, "Summary of Optical Disk Processing Technique", Nihon Kogyo Technical Center, May 15, 1985.
"Information Processing Systems—Optical Digital Data Disk", The Fifth Draft Proposal, pp. 19-29.

Primary Examiner—Roy N. Envall, Jr.
Assistant Examiner—Hindi Nabil
Attorney, Agent, or Firm—Birch, Stewart, Kolasch & Birch

[57] ABSTRACT

An optical apparatus for an optical information recording medium including a light source, two acoustooptical elements for modulating the light beam emitted from the light source and an objective lens for focusing the light beam emitted from the acoustooptical elements to the optical information recording medium, the acoustooptical elements being provided in an optical path extending from the light source to the objective lens arranged such that directions of travel of supersonic waves generated in the respective acoustooptical elements are crossed to each other.

25 Claims, 18 Drawing Sheets

FIG. 7
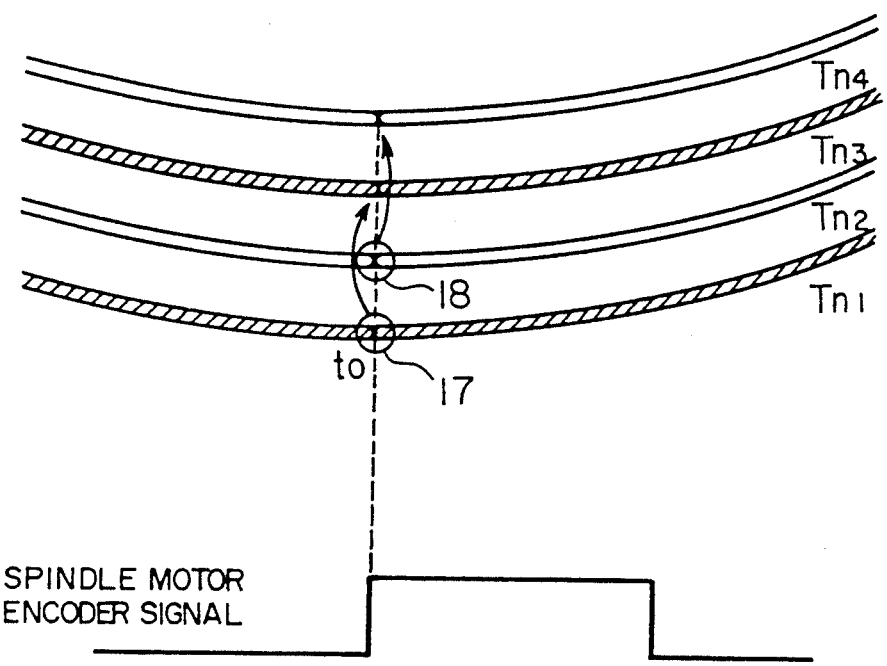
SPINDLE MOTOR
ENCODER SIGNAL
FIG. 7A     FIG. 7B     FIG. 7C
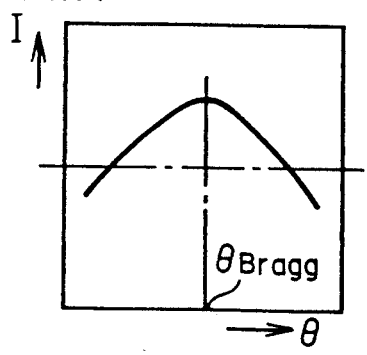
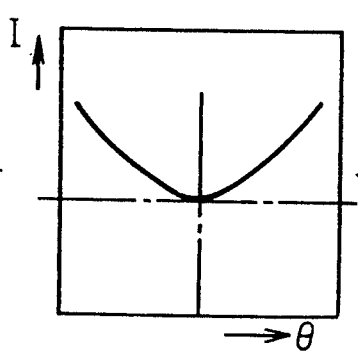
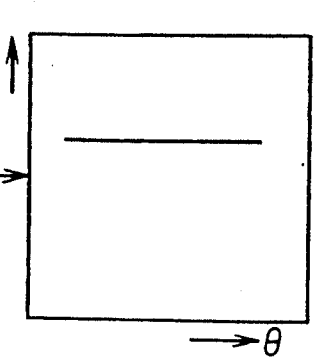

OPTICAL APPARATUS FOR OPTICAL INFORMATION RECORDING MEDIUM

BACKGROUND OF THE INVENTION

1. Field of the Invention

The present invention relates to a method for focusing at least a deflected light beam of a light beam polarized or modulated by an acoustooptical element onto an optical information recording medium or an optical disk to form prewobble pit, concentric prepit or concentric pregroove, and optical apparatus for the optical information recording medium.

2. Discussion of the Related Art

In an optical disk having prepits representing an ID signal such as an address formed for each sector to permit recording of data to a desired sector, it has been known to form wobbling pits when prepits are formed and tracking of a laser beam is controlled by using the wobbling pits when data is recorded on or reproduced from an optical disk.

However, the sizes of the wobbling pits are different from each other and accurate tracking control is not attained.

When concentric pregrooves are formed on an optical disk as an optical recording medium, a start point and an end point of the pregroove do not coincide and it is difficult to quickly form continuous concentric pregrooves.

FIG. 18 shows a perspective view of an example of an optical disk exposure apparatus. An acoustooptical element 7 is arranged in an optical path extending from a light source 6 objective lens 11.

The acoustooptical element 7, functions to control a light intensity and reduce noise ("Summary of Optical Disk Processing Technique" by Y. Okino, Nihon Kogyo Technical Center, May 15, 1985)

SUMMARY OF THE INVENTION

It is a first object of the present invention to provide an optical disk exposure apparatus which attains a uniform size of wobbling pits to enhance a precision of tracking control.

As shown in FIG. 19, a voltage having a frequency f is applied to a piezoelectric element 16 made of LiNbO$_3$ to generate a supersonic wave 15 having a wavelength $\lambda$ in a medium made of TeO$_2$ or PbMoO$_4$, and the acoustooptical element 7 or 14 functions as a diffraction grating to diffract an incident light beam A. By amplitude-modulating the supersonic wave drive voltage, a modulated light 10 is produced.

The inventors of the present invention have found that the light beam passed through the acoustooptical element 7 or 14 has its sectional shape flattened in a direction of travel of the supersonic wave due to the diffraction. For example, when a light beam having a circular sectional shape passes through the acoustooptical element 7 or 14, the sectional shape of the light beam becomes eliptically shape having a minor axis in a direction of travel of the supersonic wave 15.

In the optical apparatus for the optical information recording medium having two acoustooptical elements 7 and 14 arranged in the optical path such that directions of travel of the supersonic waves are identical like the second known apparatus, the light beam deformed by the first acoustooptical element 7 is further deformed along the minor axis by the second acoustooptical element 14.

As the sectional shape of the output light from the acoustooptical element 7 or 14, that is, the shape of the light spot irradiated to the optical disk becomes eliptic, when the sectional shape of the light spot is eliptic, the exposure width and the exposure shape of the photoresist vary more than when a circular light spot is irradiated and an ideal uneven pattern cannot be exposed. As a result, a level of a reproduced signal decreases and a C/N ratio decreases.

While the optical disk exposure apparatus has been discussed above, the same problems are encountered in a recording and reproducing apparatus. Since the shape of the write light spot is eliptic, it is not possible to form a pit having ideal width and shape. Since the width of the read light spot spreads, crosstalk of signals may occur.

It is therefore a second object of the present invention to provide an optical apparatus for an optical information recording medium which can always irradiate a circular light spot to an object.

It is a third object of the present invention to match a start position and an end position of a circular pregroove with a high precision.

In order to achieve the above objects, in accordance with the present invention, two acoustooptical elements are arranged in an optical path running from a light source to an objective lens and those two acoustooptical elements are arranged such that directions of travel of supersonic waves generated in the acoustooptical elements are crossed with each other.

As the two acoustooptical elements are arranged such that the directions of travel of the supersonic waves are crossed to each other, the light beam having a circular sectional shape emitted from the light source is first diffracted by the first acoustooptical element closer to the light source, and the sectional shape of the exit beam therefrom has an eliptical shape having a minor axis thereof oriented to the direction of travel of the supersonic wave generated in the first acoustooptical element. The exit beam from the first acoustooptical element is directed to the second acoustooptical element with the major axis of the sectional shape of the exit beam being oriented in the direction of travel of the supersonic wave generated in the second acoustooptical element. The exit beam from the first acoustooptical element is diffracted by the second acoustooptical element so that the major axis thereof is compressed in the direction of travel of the supersonic wave of the second acoustooptical element Accordingly, the deformation of the light beam caused by the first acoustooptical element is cancelled by the second acoustooptical element so that the second acoustooptical element can emit an exit beam having a circular sectional shape.

Accordingly, a correct uneven signal pattern is formed by the optical disk exposure apparatus and correct pits are formed by the recording and reproducing apparatus. Further, crosstalk due to the deformation of the light spot does not take place.

BRIEF DESCRIPTION OF THE DRAWINGS

FIGS. 3 to 7c show a second embodiment of the present invention,

DESCRIPTION OF THE INVENTION

A first embodiment of an optical disk exposure apparatus of the present invention is now explained.

Figure 1:
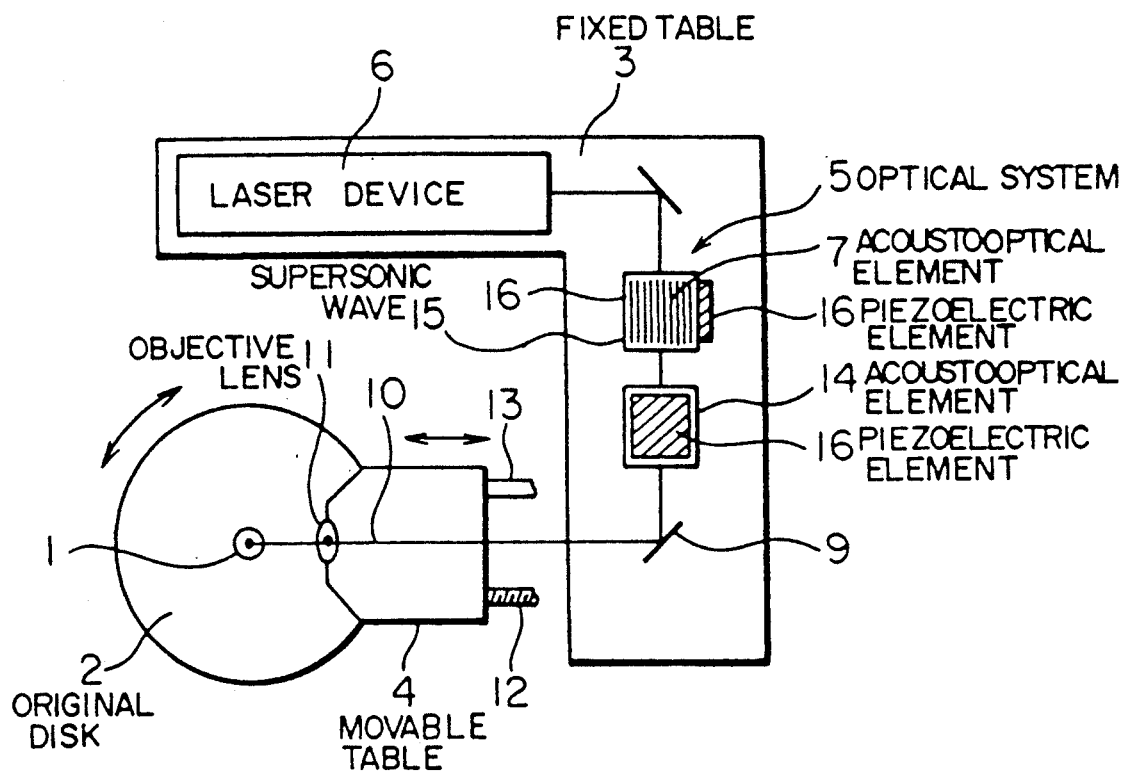
FIGS. 1 and 2 show a first embodiment of the present invention.
Figure 18:
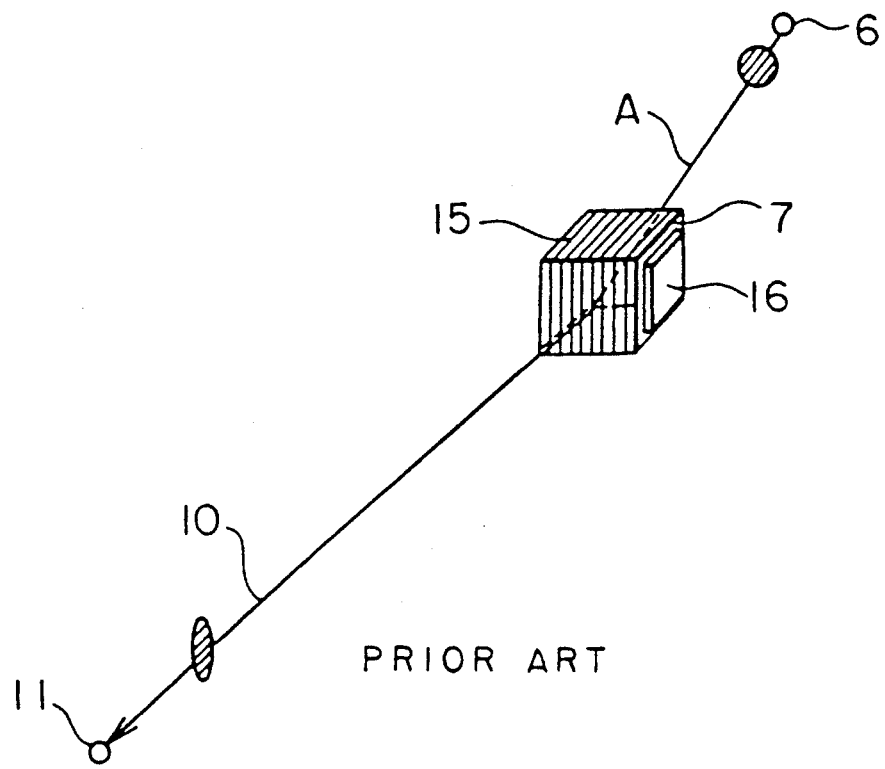
FIGS. 18 and 19 show other embodiments.
Figure 19:
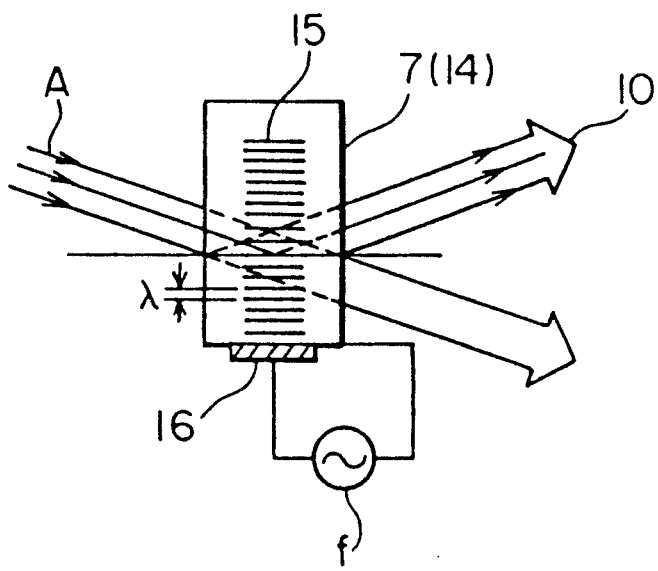

FIG. 1 shows a plan view of the optical disk exposure apparatus of the present invention, the like numbers to those shown in FIGS. 18 and 19 are designated by the like numerals.

As shown, the optical disk exposure apparatus of the present invention is basically identical to the prior art optical disk exposure apparatus except that two acoustooptical elements 7 and 14 are arranged in the optical path running from the light source 6 to the objective lens 11, such that directions of travel of the supersonic waves 15 generated in the respective acoustooptical elements are crossed to each other. A movable table 4 is adjusted to be moved through a feed screw 12 and a guide nail 13 in a direction indicated by the arrow.

Figure 2:
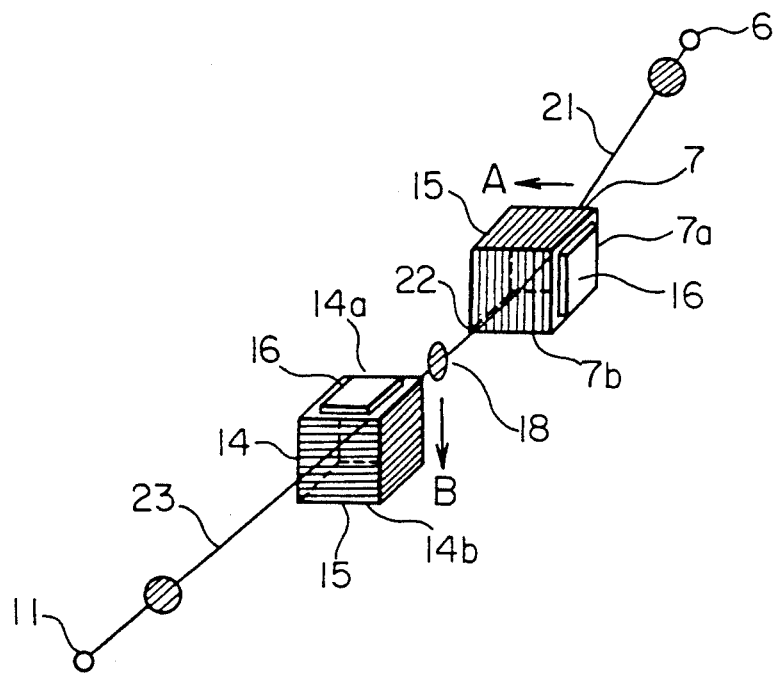

As shown in FIG. 2, the two acoustooptical elements 7 and 14 have the piezoelectric elements 16 thereof arranged offset by 90±20 degree from each other on the optical path 18 so that the direction of travel (arrow A in FIG. 2) of the supersonic wave 15 generated in the medium of the first acoustooptical element 7 and the direction of travel (arrow B in FIG. 2) of the supersonic wave 15 generated in the medium of the second acoustooptical element 14 are crossed to each other.

The first acoustooptical element 7 has a light entry plane 7a faced to the light source 6 and a light exit plane 7b faced to the objective lens 11. On the other hand, the second acoustooptical element 14 has a light entry plane 14a faced along an optical path of a primary diffracted light emitted from the light exit plane 7b of the first acoustooptical element 7 and a light exit plane 14b oriented to align to an optical axis of the objective lens 11.

In the optical apparatus for the optical information recording medium of the present embodiment, the two acoustooptical elements 7 and 14 are arranged such that the directions of travel of the supersonic waves 15 are crossed to each other. Accordingly, a light beam 21 having a circular sectional shape emitted from the light source 6 is first diffracted by the first acoustooptical element 7 closer to the light source 6 so that the sectional shape of the exit beam 22 is of an eliptical shape having a minor axis oriented along the direction of travel (arrow A in FIG. 2) of the supersonic wave 15 generated in the first acoustooptical element 7. The exit beam 22 from the first acoustooptical element 7 is directed to the second acoustooptical element 14 with a major axis of the sectional plane of the exit beam 22 being oriented along the direction of travel (arrow B in FIG. 2) of the supersonic wave generated in the second acoustooptical element 14. The exit beam 22 from the first acoustooptical element 7 is diffracted by the second acoustooptical element 14 so that a major axis of the sectional plane of the light beam is compressed along the direction of travel of the supersonic wave 15 generated int he second acousto-optical element 14. Accordingly, the deformation of the light beam 21 caused by the first acoustooptical element 7 is cancelled by the second acoustooptical element 14 so that the second acoustooptical element 14 always produces an exit beam 23 having a circular sectional shape.

As a result, an ideal circular light spot is irradiated to the photoresist plane of the optical disk and an uneven signal pattern having exact width and shape can be formed. Accordingly, the level of the reproduced signal is high and a C/N ratio is improved. The above improvement effect of a C/N ratio is obtained when directions of travel of supersonic waves generated into acoustooptical elements are crossed. If the directions are orthogonal (90±20 degree) to each other, the improvement effect is best.

As a modification of the first embodiment, the optical system described above is applied to a recording and reproducing apparatus. Where the above optical system is applied to the recording and reproducing apparatus, the shape of the write light spot is circular and ideal pits may be formed. As a result, the level of the reproduced signal is high and the C/N ratio is improved Further, since the shape of the read light spot is circular, a diameter of the light spot is of an ideal one and crosstalk due to the deformation of the shape of the laser spot is prevented.

Alternatively, the first acoustooptical element arranged closely to the light source may be used for light intensity control and noise reduction, and the second acoustooptical element may be used for modulation. The functions of the acoustooptical elements may be reversed. Alternatively, the first acoustooptical element may be used for modulation and the second acoustooptical element may be used as a wobbling deflector.

Any other known radiation source other than the laser may be used as the light source.

Figure 3:
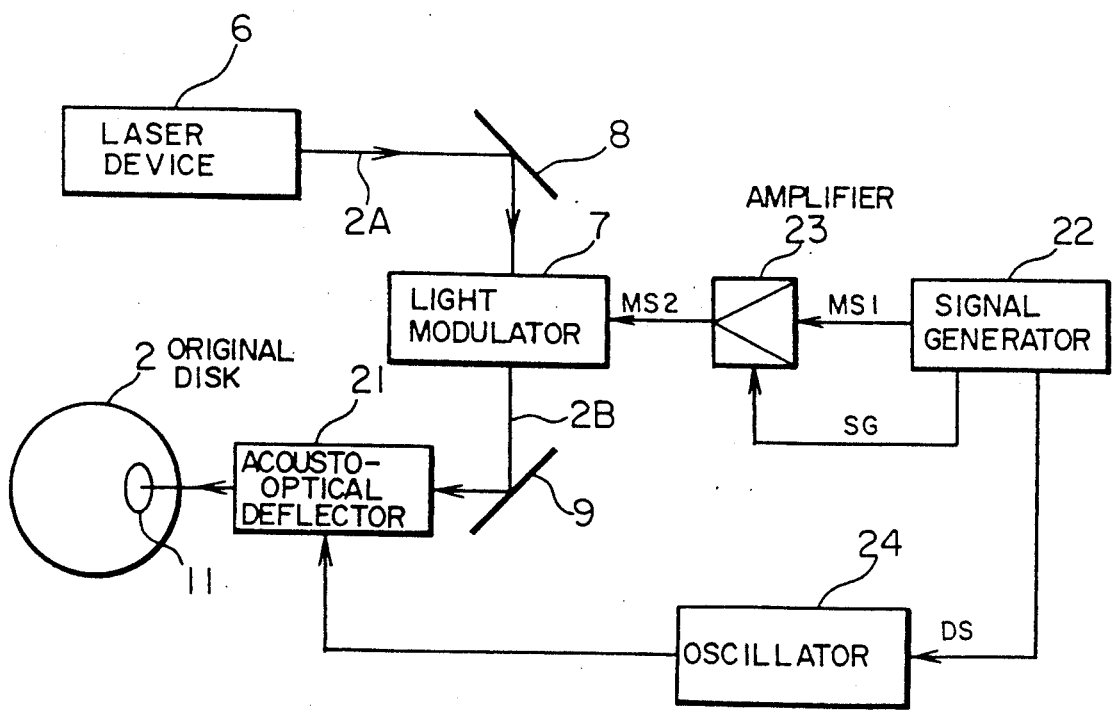

A second embodiment of the present invention is now explained with reference to FIGS. 3 to 7. In the optical system for the optical information recording medium of the second embodiment, an optical disk is provided as the optical information recording medium. A light deflector for deflecting the modulated beam when wobbling pits are to be recorded is provided in an optical path extending from the light source to the objective lens. Light intensity control means for enhancing a light intensity of a light beam which is exposed to the optical disk, in synchronism with the light deflection by the light deflector during recording of the wobbling pits, is provided FIG. 3 shows a configuration of the optical disk exposure apparatus in accordance with the present embodiment of an acoustooptical deflector (AO deflector) 21, a singal generator 22, a variable gain amplifier 23, and an oscillator 24. The like numerals to those shown in the previous drawings designate like elements.

Figure 4:
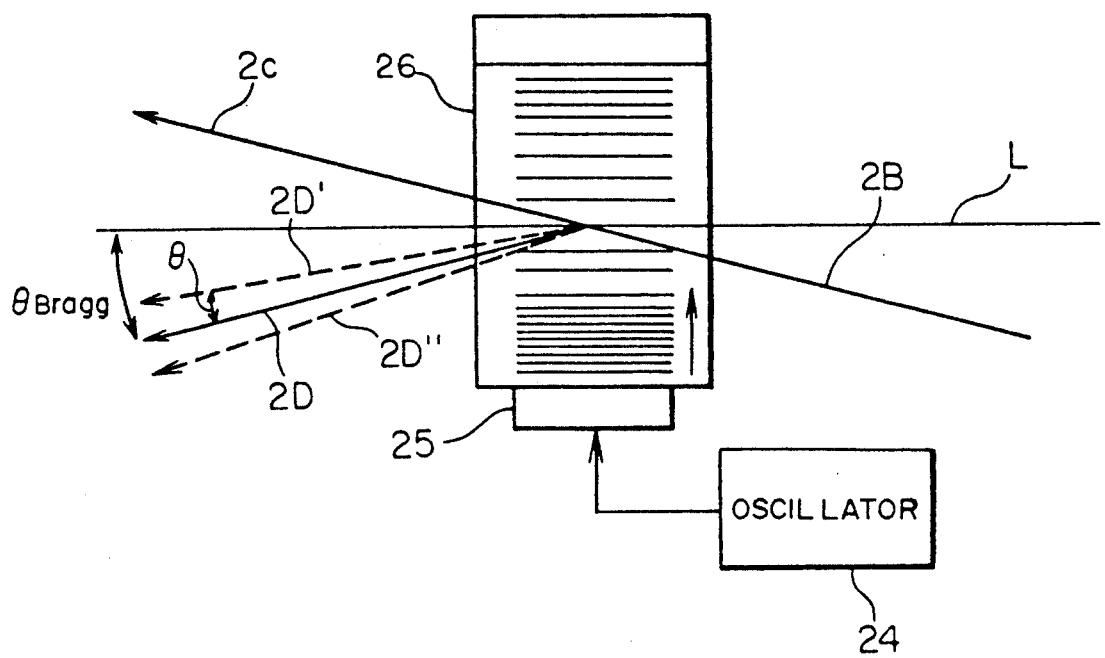
Figure 5:
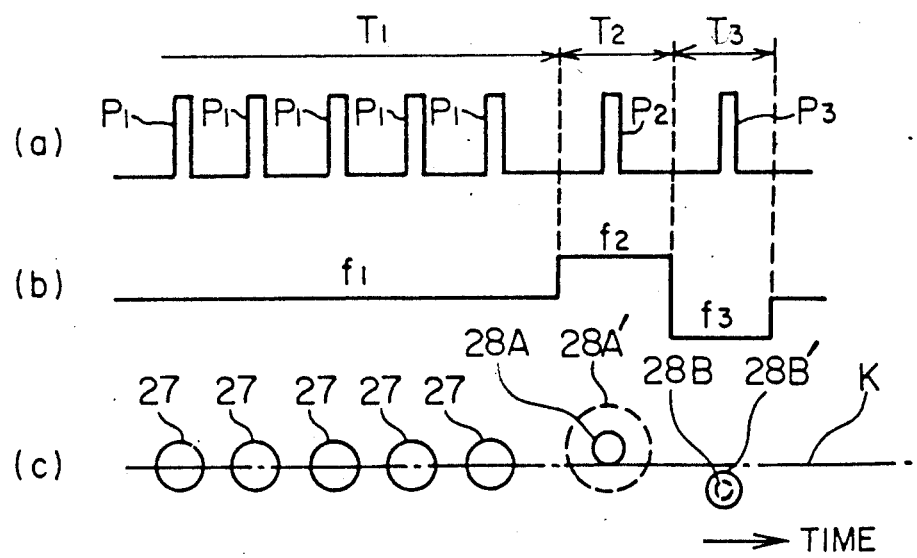
Figure 6:
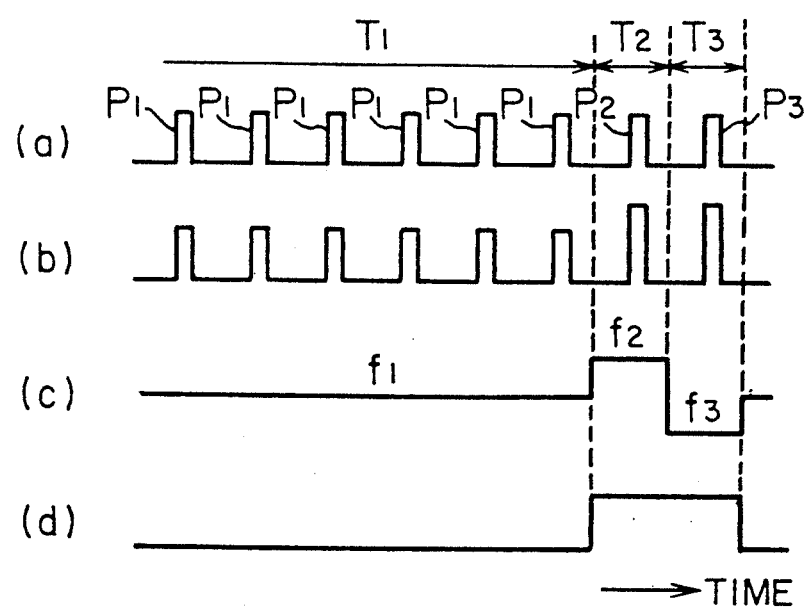

As shown in FIG. 4, a voltage having a frequency f generated by the oscillator 24 is applied to a transducer 25 made of a piezoelectric material to generate a supersonic wave, which causes a compression wave to be generated in the AO deflector 21 which is made of Te glass, $PbMoO_4$ or $TeO_2$ so that the AO deflector 21 functions as a diffraction grating As the laser beam 2B is directed to the AO deflector 21, a straightway beam 2C which passes through the AO deflector 21 and a diffracted beam 2D are produced. Assuming that a wavelength of the compression wave in the AO deflector 21 is $\lambda_1$, a wavelength of the laser beam 2B is $\lambda_2$, and an incident angle of the laser beam 2B is a Bragg angle $\theta$ which is represented by $\sin^{-1}(\lambda_2/2\lambda_1)$ for an optical axis L of the AO deflector 21, a diffracted light 2D having a maximum intensity is produced at the $\theta$ Bragg angle $\theta$.

As the frequency of the output voltage of the oscillator 24 is changed and the wavelength $\lambda_1$ of the compression wave of the AO deflector 21 is changed, the $\theta$ Bragg angle $\theta$ of the AO deflector 21 also changes. Since the incident angle of the laser beam 2B is constant, an exit angle of the diffracted light also changes.

Assuming that a period during which a pulses $P_1$ shown in FIG. 5(a) are supplied to the acoustooptical element 7 (or 14) as modulation signals is $T_1$, a frequency of the output voltage of the oscillator 24 determined by a bias voltage from a biasing source (not shown), is $f_1$ and the incident angle of the laser beam 2B is set at the Bragg angle $\theta$ of the AO deflector 21, the diffracted light 2D being emitted at the $\theta$ Bragg angle $\theta$ with a maximum intensity. The diffracted light 2D is irradiated to the optical disk 2 as a cutting laser beam so that prepits 27 are formed in the optical disk 2, as shown in FIG. 5(c).

Then, the bias voltage from the biasing source is changed for a period $T_2$ (FIG. 5(a)) during which a pulse $P_2$ is applied to the acoustooptical element 7 (or 14), so that the frequency of the output voltage of the oscillator 24 is changed to $f_2$ ($f_2 \neq f_1$) (FIG. 5(b)). The diffracted light 2D' emitted from the AO deflector 21 is offset from the $\theta$ Bragg angle $\theta$ by an angle $\theta$ in one direction. The diffracted light 2D' is also irradiated to the optical disk 2 as a cutting laser beam so that one 28A of wobbling pits which is offset from a center line K of the prepits 27, is formed as shown in FIG. 5(c).

For a period $T_3$ (FIG. 5(a)) during which the next pulse $P_3$ is applied to the acoustooptical element 7 (or 14), the bias voltage from the biasing source is again changed to change the frequency of the output voltage of the oscillator 24 to $f_3$ ($f_3 \neq f_1$, $f_2$) (FIG. 5(b)). Thus, a diffracted beam 2D" is emitted from the AO deflector 21 at a different exit angle than the $\theta$ Bragg angle $\theta$. The frequency $f_3$ of the output voltage of the oscillator 24 is set such that the exit angle of the diffracted light 2D" is offset from the $\theta$ Bragg angle $\theta$ by the angle $\theta$ in the opposite direction to that of the diffracted beam 2D'. The diffracted beam 2D" is also irradiated to the optical disk 2 as a cutting laser beam. As a result, another one 28B of the wobbling pits is formed in the optical disk 2, following to the wobbling pit 28A, at a position which is offset from the center line K in the opposite direction and by the same distance to those of the wobbling pit 28A.

In this manner, the prepits and the wobbling pits are formed for each sector of the optical disk.

The signal generator 22 in FIG. 3 generates a pulse signal MSI consisting of the pulse $P_1$ for forming the prepits and the pulses $P_2$ and $P_3$ for forming the wobbling pits, and also generates a gain control signal SG and a bias voltage DS, as shown in FIG. 6(a). The pulse signal MSI is amplified by the variable gain amplifier 23 and it is then supplied to the acoustooptical element 7 (or 14) to modulate the light beam emitted from the laser device 6. The levels of the bias voltage DS in the period $T_1$ for the pulses $P_1$, the period $T_2$ for the pulse $P_2$ and the period $T_3$ for the pulse $P_3$ are different from each other. The oscillator 24 is controlled by the bias voltage DS so that the frequency of the output voltage of the oscillator 24 is set to $f_1$, $f_2$ and $f_3$ for the periods $T_1$, $T_2$ and $T_3$, respectively. As a result, the prepits 27 and the wobbling pits 28, which are offset from the center line K of the prepits 27, are formed on the optical disk 2, as shown in FIG. 5(c).

On the other hand, the gain control signal SG from the signal generator 22 has different levels during the period $T_1$ and the period $(T_2 + T_3)$ of the pulse signal MS1, as shown in FIG. 6(d) so that the gain of the variable gain amplifier 23 is changed. As explained above, the intensity of the diffracted light emitted from the AO deflector 21 is maximum when the incident angle and the exit angle are equal to the $\theta$ Bragg angle $\theta$. As shown in FIG. 7(a), if the conditions are set such that the diffracted light emitted at the $\theta$ Bragg angle $\theta$ when the frequency of the output voltage of the oscillator 24 is $f_1$ (FIG. 6(c)), the intensity of the diffracted light decreases if the exit angle of the diffracted light is offest from the $\theta$ Bragg angle $\theta$ in any direction. As shown in FIG. 7(b), the gain characteristic of the variable gain amplifier 23 has a reverse characteristic to the diffracted light output characteristic of the AO deflector 21. The exit angle of the diffracted light from the AO deflector 21 is offset from the $\theta$ Bragg angle $\theta$ to decrease the intensity of the diffracted light, and the gain of the variable gain amplifier 23 is controlled by the gain control signal SG (FIG. 6(d)) such that the decrease in the intensity of the diffracted light is compensated and the intensity of the diffracted light is uniform with respect to the exit angle, as shown in FIG. 7(c).

As a result, the pulses $P_2$ and $P_3$ of the pulse signal MSI are amplified more than the pulse $P_1$ by the variable gain amplifier 23. The light beam 2A is modulated in the acoustooptical element 7 (or 14) by the output pulse signal MS2 (FIG. 6(b)) of the variable gain amplifier 23 so that the intensity of the laser beam emitted from the AO deflector 21 as the diffracted beam is same for the periods $T_1$, $T_2$ and $T_3$ and the sizes of the prepits 27 and the wobbling pits 28 formed on the optical disk are equal.

Accordingly, even if the incident angle of the light beam 2B to the AO deflector 21 is not set to the $\theta$ Bragg angle $\theta$ with a high precision, the sizes of the two wobbling pits 28 formed on the opposite sides of the center line K of the prepits 27 are equal. Further, since those wobbling pits 28 are formed by the laser beam having the same intensity as that of the laser beam for forming the prepits 27, the levels $V_1$ and $V_2$ of the signals reproduced from the respective wobbling pits 28 are very high, and the tracking control is effected at a high precision without error.

In the present embodiment, the reduction of intensity of the diffracted light is compensated by the acoustooptical element 7 (or 14). It may be compensated by other means such as by controlling the amplitude of the output voltage of the oscillator 24 to change the intensity of the ultrasonic wave in the AO deflector 21.

A third embodiment of the present invention is explained with reference to FIGS. 8 to 13. In the optical apparatus for the optical information recording medium of the third embodiment, an optical disk is provided as the optical information recording medium, and an acoustooptical deflector, is arranged in an optical path extending from the two acoustooptical elements to the objective lens. The acoustooptical deflector is driven such that when the optical system, including the objective lens, is moved at a constant speed radially of the optical disk while the optical disk is rotated, a locus of the light spot irradiated onto the optical disk draws concentric circles.

Figure 8:
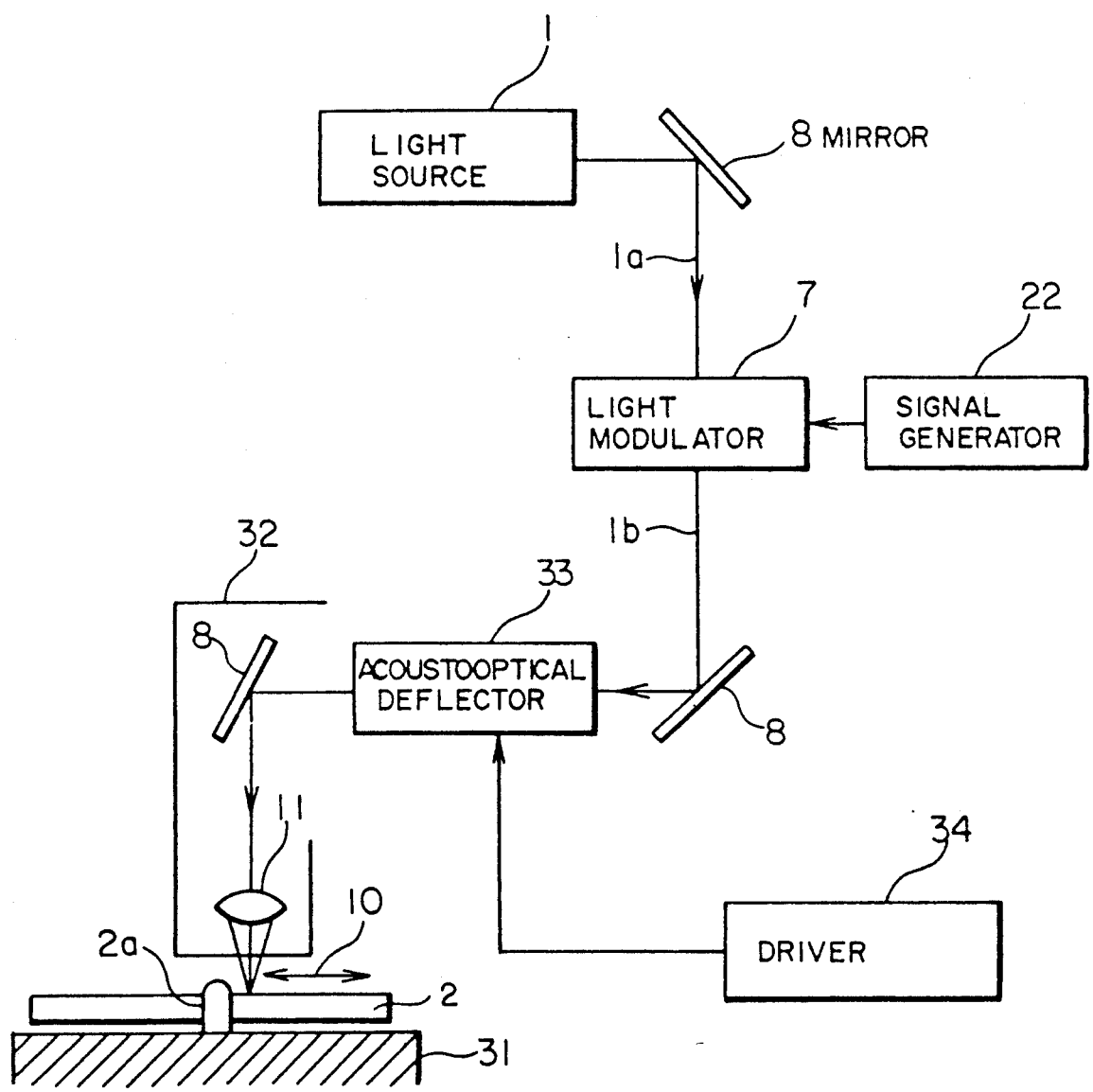
FIGS. 8 to 13 show a third embodiment of the present invention.

The optical disk exposure apparatus of the third embodiment in FIG. 8 denotes a spindle motor 31, an optical system 32 and a driver 34 for the AO deflector 33. The like numerals to those shown in the previous drawings designate like elements.

The optical disk 2 is of a disk shape having a center hole 2a. A spindle projecting from the spindle motor 31 is fitted to the center hole 2a so that the optical disk 2 is mounted on the spindle motor 31. The optical disk 2 has a photoresist film uniformly applied thereon. When a light beam having a predetermined wavelength is irradiated to the optical disk and the optical disk is developed after the exposure, a grooved pattern which is identical to the light beam irradiation pattern is formed.

The optical system 32 comprises a light source 1 such as a laser, a light modulator 7 for modulating the light beam 1a emitted from the light source 1, a signal generator 22 for applying a modulation signal to the light modulator 7, an AO deflector 33 for controlling the direction of travel of the modulated beam 1b, a driver 34 for the AO deflector 33, an objective lens 11 for focusing the modulated beam 1b onto the photoresist plane of the optical disk 2, and a predetermined number of mirrors 8.

The objective lens 11 (optical head 32) is movable radially of the optical disk 2. A horizontal distance 10 between the optical disk 2 and the objective lens can be adjusted by the distance of movement of the objective lens 11. Accordingly, when the objective lens 11 is moved radially of the optical disk 2 while the RF signal applied to the AO deflector 33 is kept constant and the spindle motor 31 is rotated, a spiral continuous track is formed on the optical disk 2.

Figure 9A:
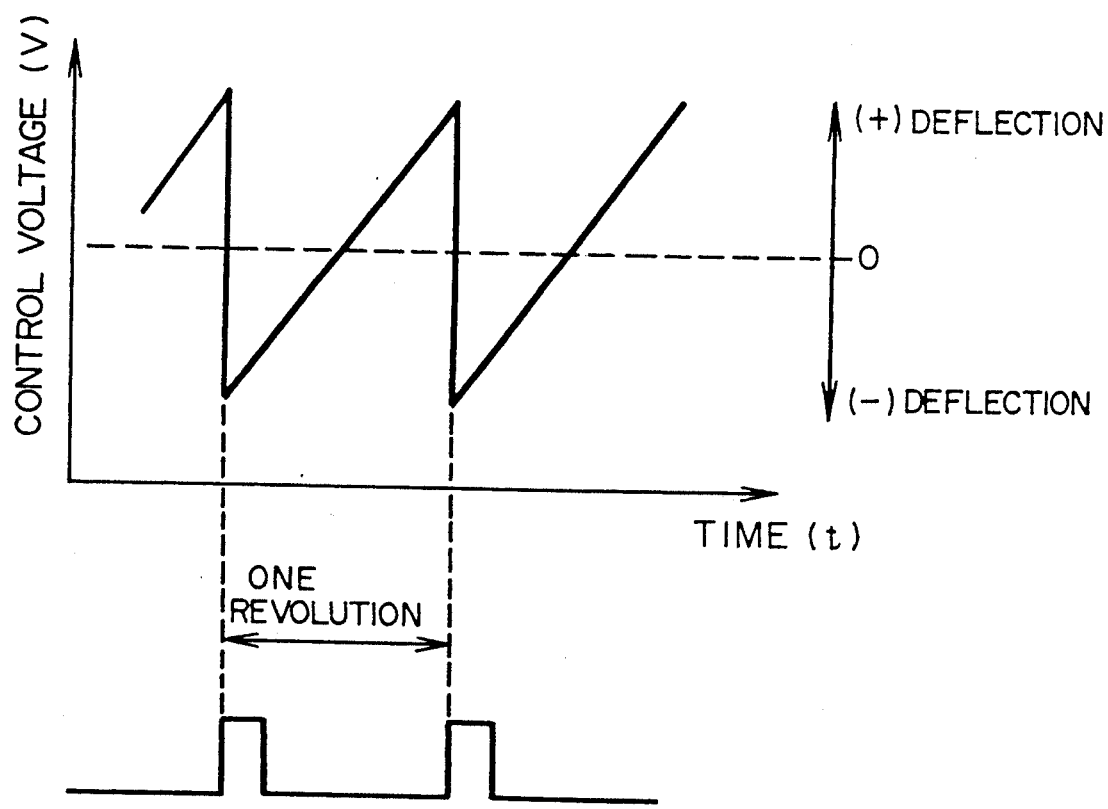
Figure 9B:
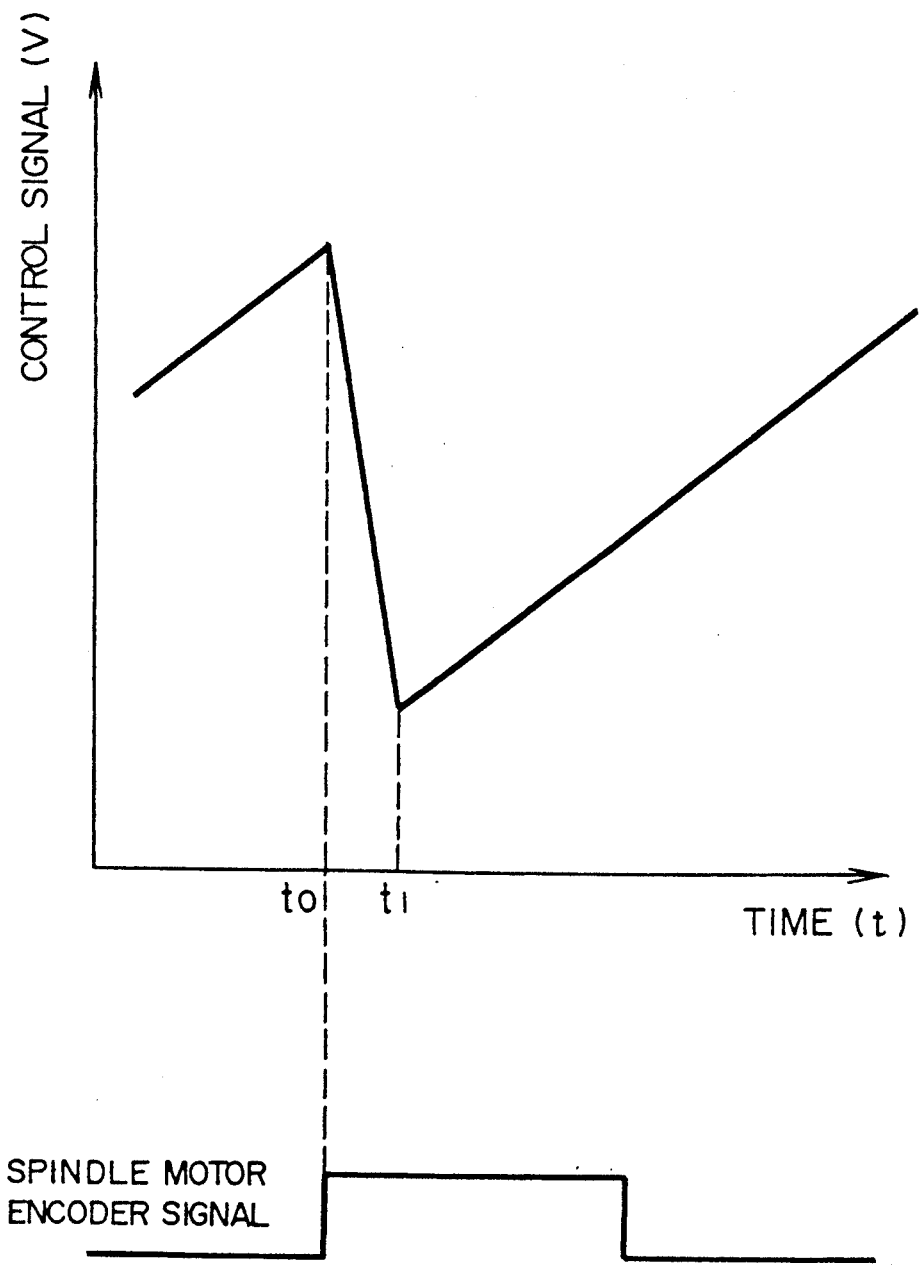
Figure 10A:
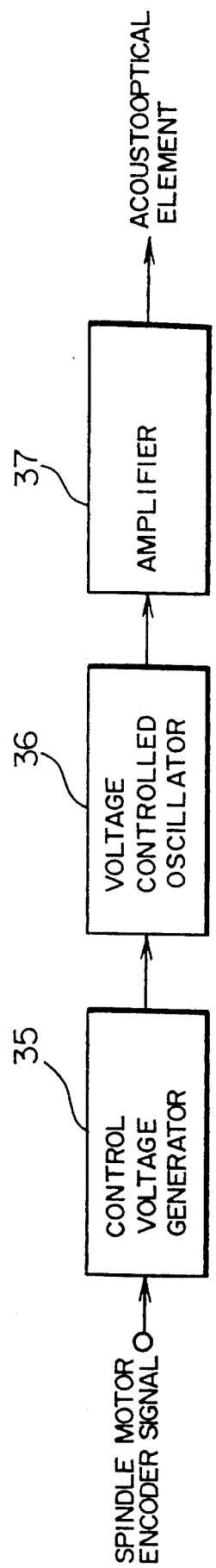

In the present embodiment, a saw tooth drive signal, as shown in FIGS. 9A and 9B, is applied to the AO deflector 33 to swing the light beam emitted from the AO deflector 33 radially of the optical disk 2 (in the same direction as that of the horizontal distance 10) so that the locus of the light spot irradiated on the optical disk is concentric. As shown in FIG. 9A, falling edges (or rising edges) of the sawtooth drive signal are in synchronism with an encoder signal of the spindle motor 31. Each time the spindle motor 31 (optical disk 2) makes one revolution, the light beam is swung once radially of the optical disk 2, and the deflection characteristic is linearly controlled by the ramp portions of the drive signal As shown in FIG. 10A, the driver 34 for the AO deflector 33 comprises a control voltage generator 35, a voltage controlled oscillator 36 and an amplifier 37, and conducts continuous deflection control.

As shown in FIG. 9A, when the drive signal for the AO deflector 33 is the sawtooth wave which does not need time to fall, the optical disk 2 is produced without unexposed area in each track.

Figure 10B:
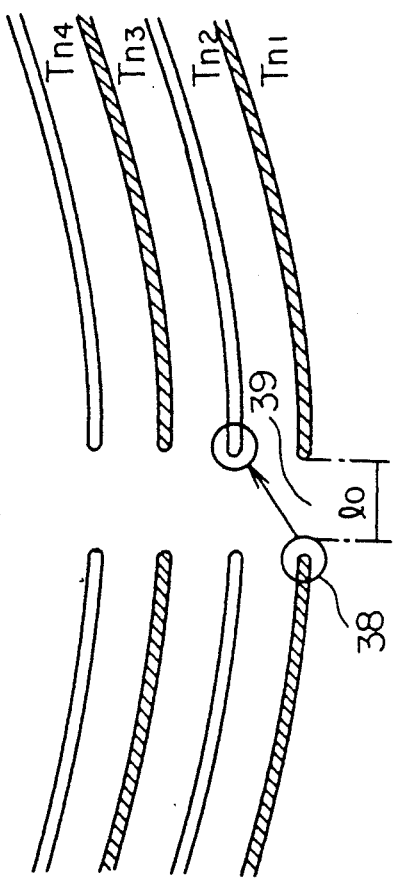

In actual, however, it is not possible to generate such a drive signal and a response time of the voltage controlled oscillator is not negligible, as shown in FIG. 9B, a time period $t_1-t_0$ is required from the start to the end of the fall of the drive signal. As shown in FIG. 10B, the time period $t_1-t_0$ corresponds to a time period required to swing the light spot 38 to the end point of the exposed track $T_{n1}$ to the exposure start point of the next track $T_{n2}$. An unexposed area 39 having a length $l_0$ which corresponds to the time period $t_1-t_0$ is formed between the exposure start point and the exposure end point of each track As described above, since the fall of the drive signal is in synchronism with the encoder signal of the spindle motor 31, the unexposed areas 39 are formed in a predetermined radial direction on the optical disk 2.

The optical disk cutter of the present embodiment may be applied for cutting of an optical disk having a predetermined length of unexposed area in each track, such as ISO formatting content (ISO/TC 97/SC 23 N119). According to the ISO formatting content, a one-byte unexposed area is provided at the end of a preformat area of each sector, and a time required for a light beam to pass through that area is approximately 1.44 $\mu$ seconds. The optical disk cutter of the present embodiment has the AO deflector of a high response as the light beam deflection means and it is possible to set the time period $t_1-t_0$ of FIG. 9B within the above traveling time (approximately 1.44 $\mu$ seconds). Accordingly, the optical disk medium having the format compatible to the ISO standard can be manufactured.

A modification of the third embodiment is now explained with reference to FIGS. 11 and 12. In the present modification, the unexposed area is not formed between the exposure start point and the exposure end point of each track.

Figure 11:
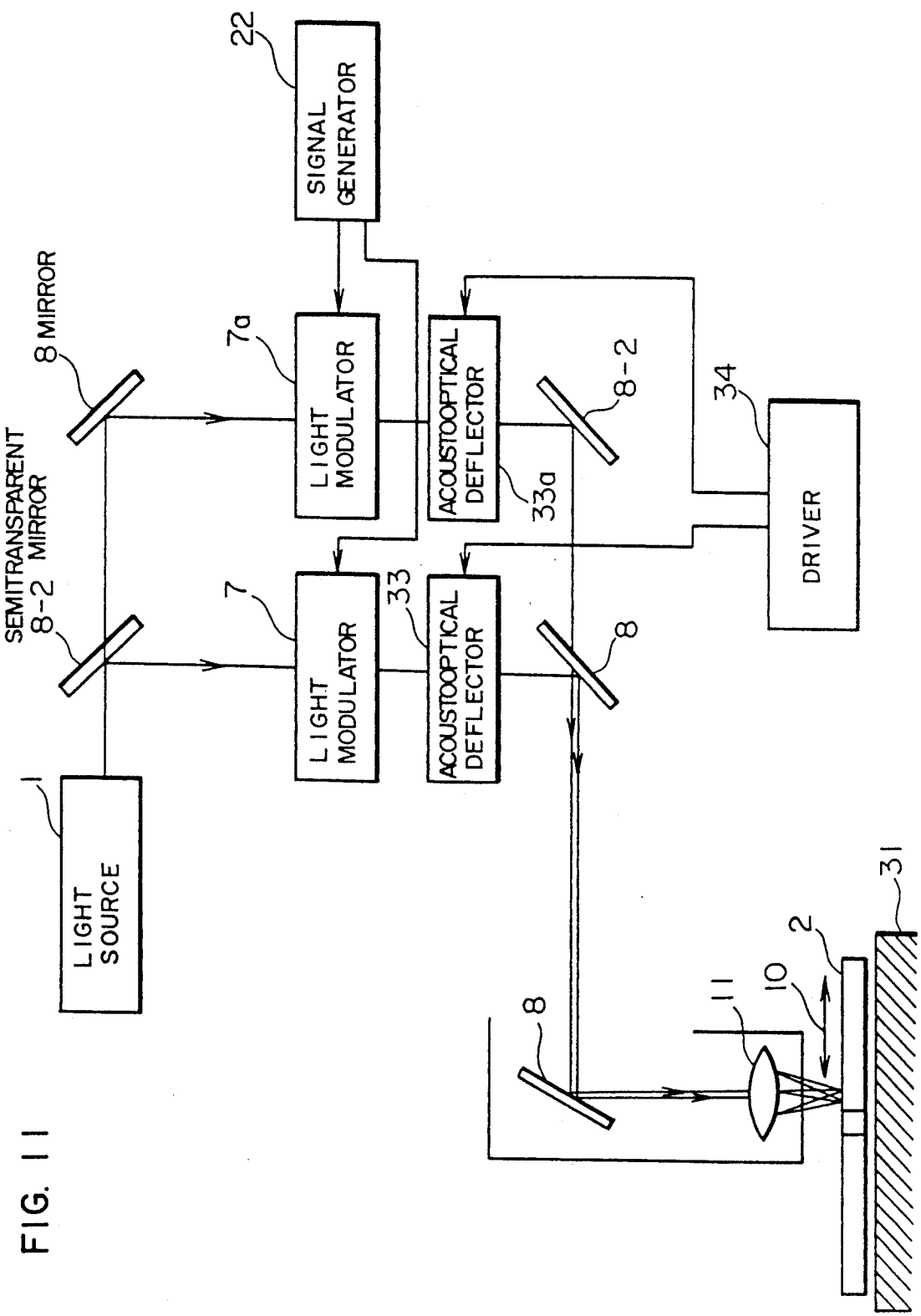

As shown in FIG. 11, the optical disk cutter of the present modification has two light modulators 7 and 7a, and two AO deflectors 33 and 33a as the optical system. Numeral 8-2 denotes a semitransparent mirror for splitting a light beam or combining light beams.

Figure 12:
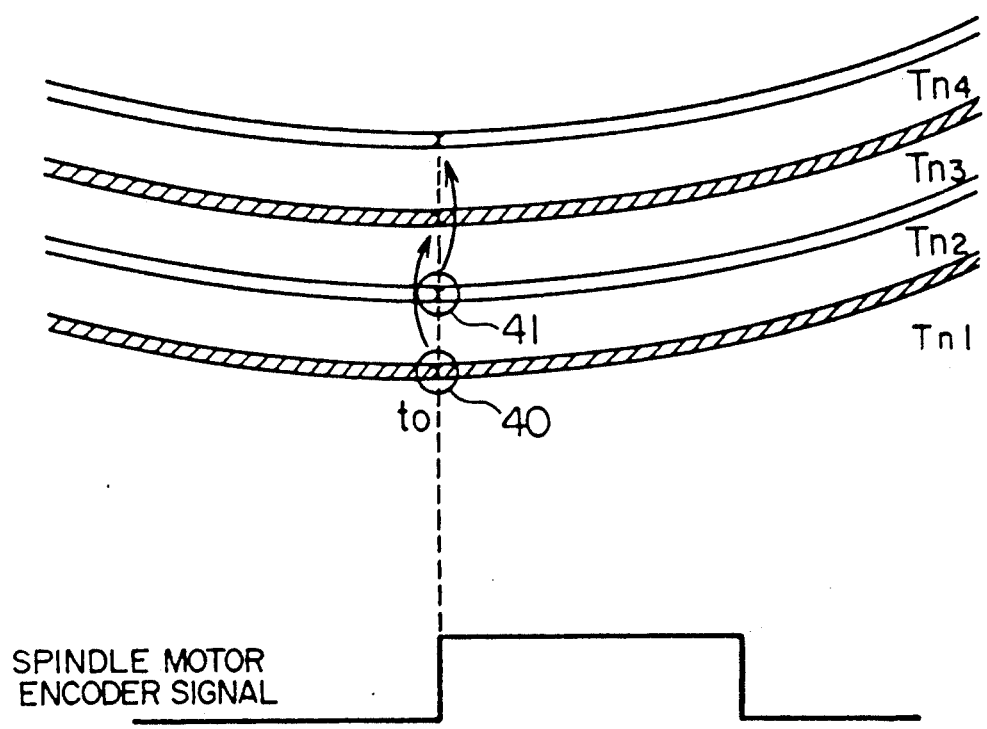

In the present optical disk cutter, as shown in FIG. 12, a first track $T_{n1}$ is irradiated by a first light beam 40, a second track $T_{n2}$ then irradiated by a second light beam 41 while the first light beam 40 is swung to a third track $T_{n3}$.

This is explained in more detail. The drive signal for the AO deflectors 33 and 33a is in synchronism with the encoder signal of the spindle motor 31 so that it is always switched at a time $t_0$ of FIG. 12. The objective lens 11 is moved at a constant speed radially of the optical disk 2 while the spindle motor 31 is rotated at a constant speed to drive the first of the two AO deflectors 33 so that the circular first track $T_{n1}$ is exposed on the optical disk 2. No drive signal is applied to the second AO deflector 33a, which stands by to irradiate the light beam of the predetermined intensity to the second track.

When the exposure to the first track $T_{n1}$ terminates and the first light beam 40 returns to a position. λtime $t_0$ in FIG. 12, corresponding to the rise of the encoder signal of the spindle motor 31, a switch in the driver 34 for the AO deflector disconnects the first AO deflector 33 and connects the second AO deflector 33a so that the light beam is exposed to the second track $T_{n2}$. While the light beam is exposed to the second track $T_{n2}$, a predetermined drive signal is applied to the first AO deflector 33 to swing the first light beam to the third track $T_{n3}$ which is to be exposed next. The intensity of the first light beam 40 is controlled by the first light modulator 7 such that it is not expose to the photoresist layer. In a similar manner, adjacent tracks are alternately exposed to sequentially cut the tracks.

Since the optical disk cutter of the present modification has two AO deflectors 33 and 33a in the optical system, the tracks are cut without unexposed area.

The precision of connection of the exposure start point and the exposure end point in each track is affected by a difference between an on time and an off time of the switch when the beam is switched, but since it can be shortened sufficiently, a substantially circular track may be formed. When a higher precision track is required, the time for turn on of the switch is rendered shorter than the time for turn off so that the track without unexposed area is formed.

Another modification of the third embodiment is explained with reference to FIG. 13. In the optical disk cutter of the present modification, the degree of circle of the track exposed is further improved by finely adjusting the drive signal of the AO deflector 33.

Figure 13:
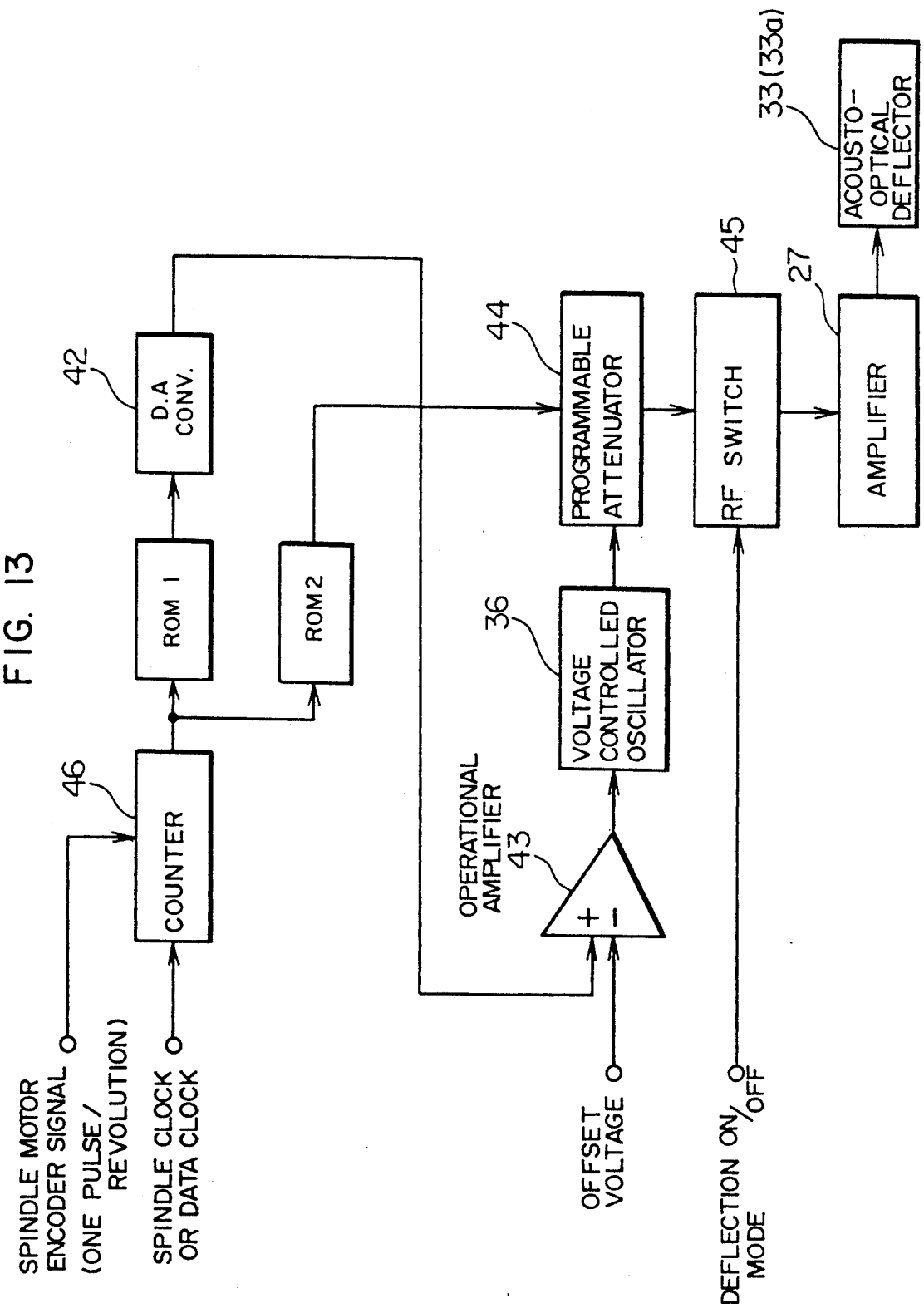

FIG. 13 shows a driver for the AO deflector 33. A counter 46 counts the encoder signal which is generated one for each revolution of the spindle motor 31, and a spindle clock or data clock.

A memory ROM1 stores, in digital data, a reverse characteristic of the non-linear characteristic of the voltage controlled oscillator 36 in order to assure the linearity. A desired linearity is attained by multiplying those characteristics. The memory ROM1 receives the counter output as address data and outputs data at any circumferential position of the optical disk.

A DA converter 42 is used to generate an analog signal based on the digital data from the memory ROM1, and it produces a signal for driving the voltage controlled oscillator 36.

An operational amplifier 43 applies to the voltage controlled oscillator 36 an offset voltage to match an operational center of the drive signal for the voltage controlled oscillator 36 to an operational center of the voltage controlled oscillator 36, and varies the gain to control the deflection width (deflection sensitivity and tracking pitch).

A memory ROM2 and a programmable attenuator 44 control the drive level in synchronism with a shift of the drive frequency so that an efficiency of the AO deflector 33 does not decrease when the drive frequency of the drive signal applied to the AO deflector 33 is offset from the center frequency. The memory ROM2 stores data related to the content of the memory ROM1. The variable attenuator 44 is controlled by the data of the memory ROM2 so that the light output level from the AO deflector 33 is kept constant The RF signal having the level adjusted by the variable attenuator 44 is applied to the AO deflector 33 through an RF switch 45 and an amplifier 27. The AO deflector 33 is driven when a predetermined drive level is reached.

The RF switch 45 may be controlled by the turn-on or turn-off of the deflected beam. Like the optical disk cutter of the second modification, the present modification may be applied to beam switching in the optical disk cutter having a plurality of AO deflectors.

Instead of the configuration shown in FIG. 13, a portion of the light output from the AO deflector 33 may be monitored and the light intensity and the deflection may be automatically corrected through a feedback system In the present embodiment, only the AO deflector 33 is provided with means for controlling the drive level in synchronism with the shift of the drive frequency, although the AO modulators 7 and 7a may also be provided with such means.

In the optical disk cutter of the present embodiment, the means for controlling the drive level in synchronism with the shift of the drive frequency are provided for the AO deflectors 33 and 33a and/or the AO modulators 7 and 7a. Accordingly, even if the drive frequency of the drive signal applied to the AO deflector 33 deviates from the center frequency, the efficiency of the AO deflectors 33 and 33a (or AO modulators 7 and 7a) does not decrease and the concentric tracks of high degree of roundness can be drawn.

While the optical disk cutter has been described above, the gist of the present invention is not limited to the optical disk cutter but it is applicable as it is to a recording and reproducing apparatus for the optical disk medium.

A fourth embodiment of the present invention is explained with reference to FIG. 14C. In the optical apparatus for the optical information recording medium of the fourth embodiment, an optical disk is used as the optical information recording medium, and a beam splitter for splitting the light beam emitted from the light source into a plurality of beams is provided in an optical path extending from the light source to the objective lens. A beam shifter for adjusting an interval of laser spots irradiated on the optical disk from the optical head by shifting the radial position thereof to no more than one half of a radial pitch of the preformat is provided in at least one of exit optical paths of the beam splitter.

Figure 14A:
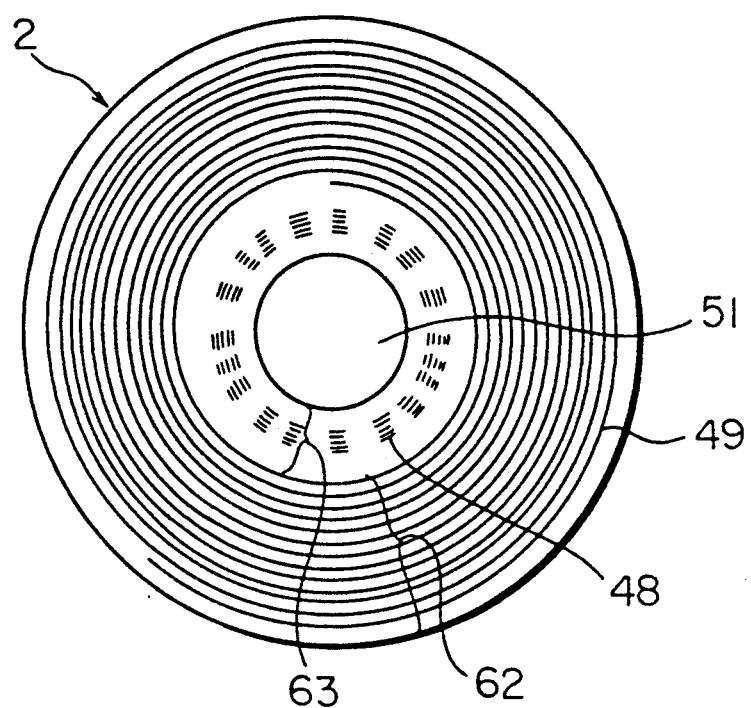
FIGS. 14A-14D show a fourth embodiment of the present invention.
Figure 14B:
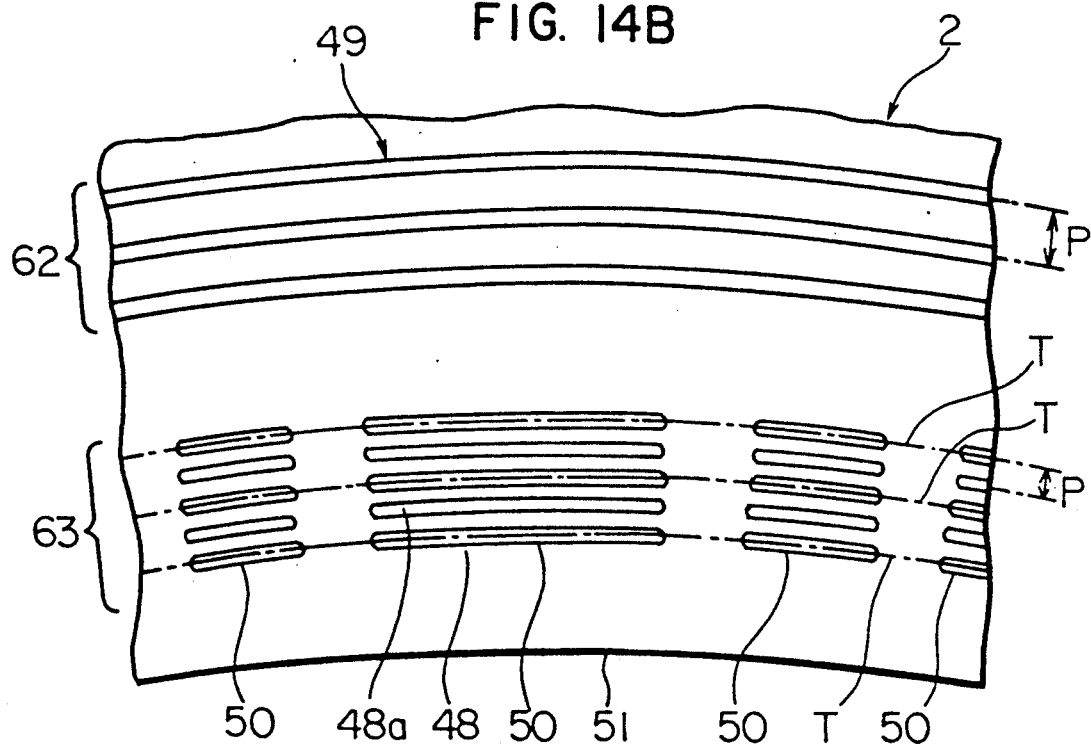
Figure 14C:
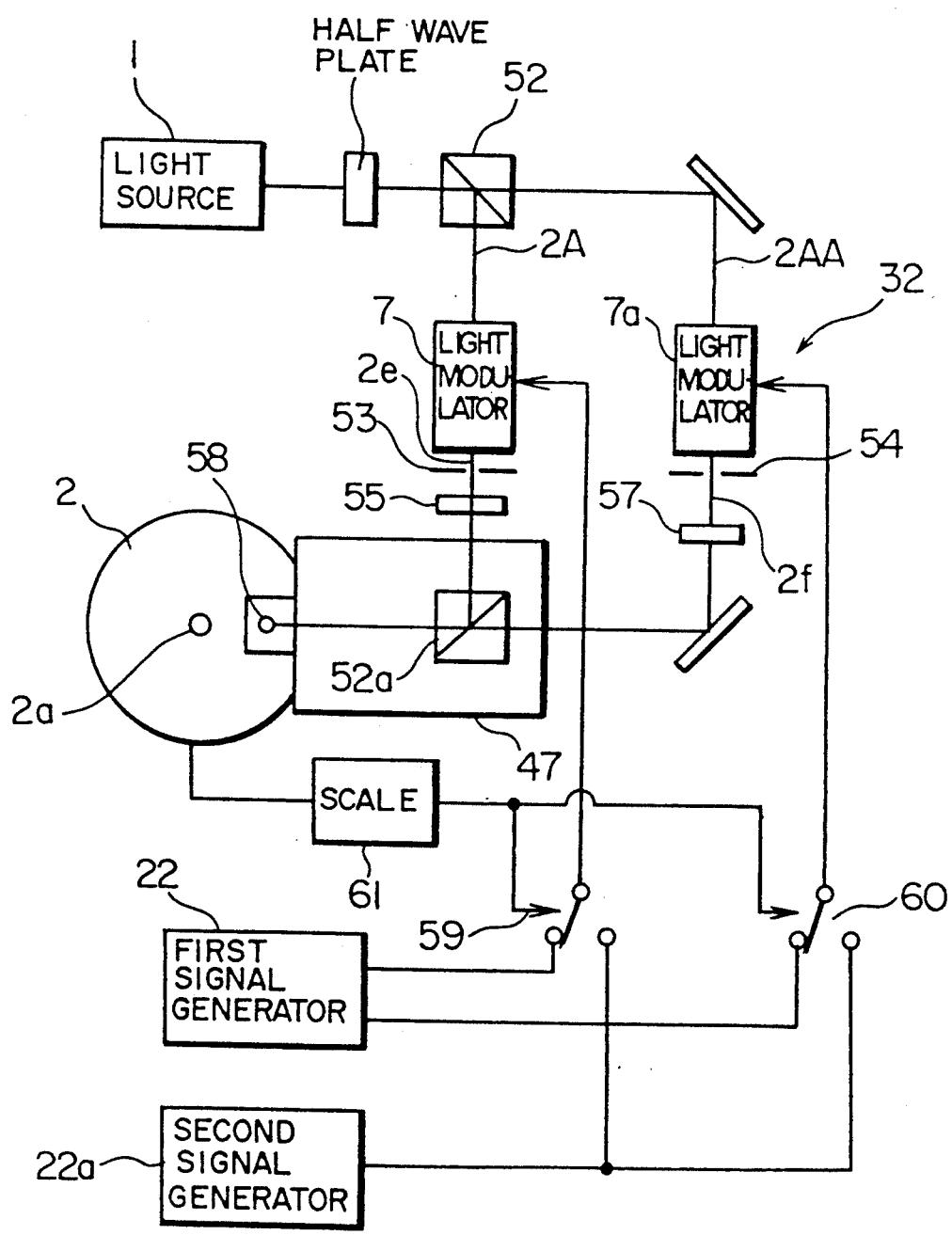

FIG. 14C shows a plan view of the optical disk exposure apparatus of the present embodiment. It comprises a spindle 2a for driving the optical disk 2, an optical system 32 and a carriage 47 for moving a movable unit of the optical system 32 radially of the optical disk 2.

FIG. 14A shows a plan view of an overall construction of the optical information recording disk of the present invention, and FIG. 14B shows a plan view of detail of an identifier.

In the present embodiment, the radial pitch p of the identifiers 48 is set to one half of the radial pitch P of the preformat 49. Of two adjacent identifiers 48 and 48a, one identifier 48 is formed along a spiral line T of a constant pitch centered at a center of rotation 0 of the optical information recording disk 2 following to the preformat 49, and the other identifier 48a is formed at a mid-point of the spiral line T.

The identifiers 48 and 48a indicate desired recording and reproducing conditions by a combination of positions and lengths of the uneven patterns 50 contained in one circumference. The identical identifiers 48 are arranged radially on a plurality of circumferences in the same arrangement. Thus, when the optical information recording disk 2 is viewed in the direction of plane, a plurality of bar codes arranged radially are observed.

The present invention relates to the identifier fromed outside of the data write area and it is applicable to any known optical information recording disk.

Figure 14D:
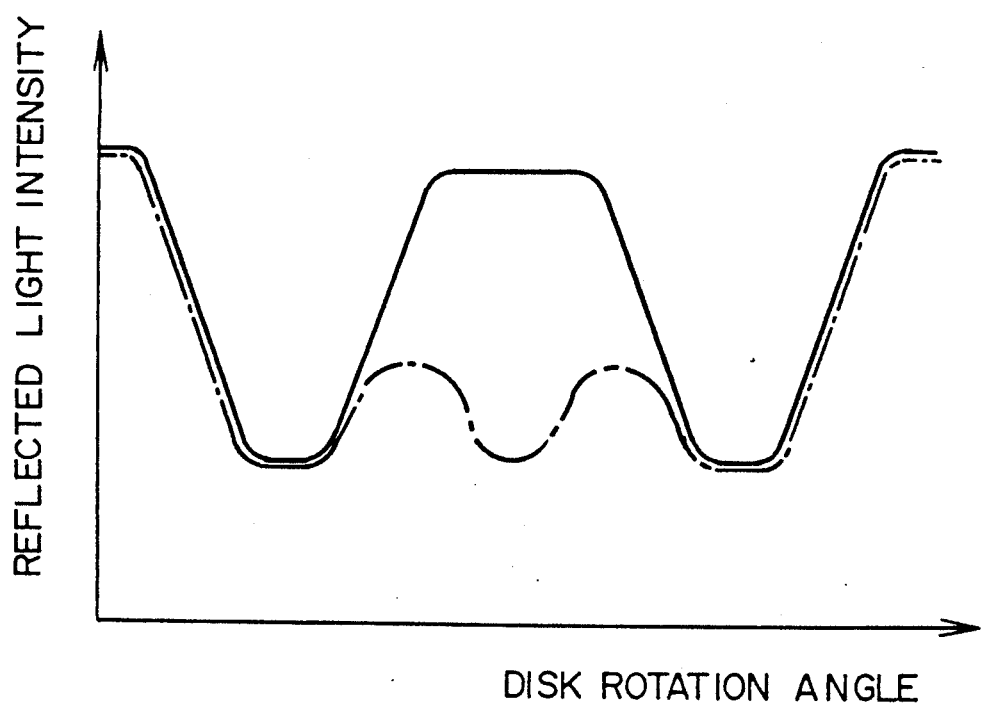

In the optical information recording disk 2 of the present embodiment, the radial pitch p of the identifiers 48 and 48a is set to one half of the radial pitch P of the preformat 49. Accordingly, when the identifiers 48 and 48a are read, a portion of the reproducing laser spot having a spot diameter substantially equal to the radial pitch P of the preformat 49 is always over the uneven pattern 50 in an out of track condition. As a result, as shown by a chain line in FIG. 14D, a light intensity of the reflected light from the land area decreases and a plurality of uneven patterns crossed by the reproducing laser spot are recognized as one uneven pattern so that misreading of the identifiers due to the out of tracking of the reproducing laser spot is prevented. Accordingly, recording and reproducing error and breaking of the optical information recording disk are prevented.

The optical disk exposure apparatus applied to the manufacture of the optical information recording disk shown in FIGS. 14A and 14B is now explained.

FIG. 14C shows a plan view of the optical disk exposure apparatus of the present invention. It comprises a spindle 2a for driving the optical disk 2, an optical system 32 and a carriage 47 for moving a movable unit of the optical system 32 radially of the optical disk 2.

The optical system 32 comprises a laser light source 1, a half wavelength plate, a beam splitter 52, two light modulators 7 and 7a for modulating laser beams 2A and 2AA split by the beam splitter 52, shutters 53 and 54 arranged at exits of the light modulators 7 and 7a, a beam shifter 55 for adjusting an optical axis of a laser beam 2c transmitted from one 7 of the two light modulators 7 and 7a, a one-half wavelength plate 57 for adjusting a phase of a laser beam 2d transmitted from the other light modulator 7a, a beam splitter 52a for combining the two laser beams 2e and 2f, and an optical head 58 mounted on a carriage 47.

In the two light modulators 7 and 7a, a first signal generator 22 for supplying a preformat signal is connected through switches 59 and 60, and a second signal generator 22a for supplying an indentifier signal is connected through switches 59 and 60.

The switches 59 and 60 are appropriately switched in accordance with a scale 61 for detecting a position of the optical head 58 on the optical disk.

A method for manufacturing the optical information recording disk of the previous embodiment by using the optical disk exposure apparatus is now explained.

The beam shifter 55 is first adjusted to focus the two laser beams 2e and 2f emitted from the two light modulators 7 and 7a onto the optical disk 2 with an interval equal to one half of the radial pitch P of the preformat.

Under this condition, the optical disk 2 is rotated at a predetermined rotation speed and the carriage 47 (optical head 58) is moved from an inner circumference to an outer circumference of the optical disk 2 at a constant speed.

When the scale 61 detects a beginning point of a predetermined identifier area, the switches 59 and 60 are switched to the second signal generator 22a so that the same identifier signal is applied to the light modulators 7 and 7a. The two laser beams 2A and 2AA split by the beam splitter 52 are modulated by the identifier signal, and they are irradiated onto the optical disk 2. Thus, the two lines of identifier signals having a radial pitch equal to one half of the radial pitch P of the preformat 49 are formed on the optical disk 2.

When the scale 61 detects an end point of the predetermined identifier area, the shutters 53 and 54 block the optical paths so that the irradiation of the laser beam to the optical disk 2 is interrupted.

When the scale 61 detects a beginning point of a predetermined preformat area, the switches 59 and 60 are switched to the first signal generator 22 and one of the two shutters 53 and 54 are opened so that one line of laser beam modulated by the preformat signal is irradiated to the optical disk. Thus, a preformat having the radial pitch P which is two times as large as that of the identifier signals 48 and 48a is formed on the optical disk 2.

Finally, when the scale 61 detects an end point of the predetermined preformat area, the shutters 53 and 54 block the optical paths, the laser 1 is deactivated and the cutting of the optical disk 2 is terminated.

In the optical disk exposure apparatus of the present invention, when the identifier signal 48 is to be recorded, a plurality of cutting laser beams are irradiated in parallel, and when the preformat 49 is to be recorded, only one of the cutting laser beams is irradiated. Accordingly, the identifier 48 having a narrow radial pitch and the preformat 49 having a wide radial pitch can be formed in a serial process. Since it is not necessary to change the moving velocity of the optical head 58 or the rotation speed of the optical disk 2, the identifiers 48 and 48a and the preformat 49 can be formed in one serial process and the cutting process of the optical disk is significantly simplified. Since two independently operable light modulators 7 and 7a are provided, when the preformat 49 is to be formed, a DC signal for a guide track and an alternate signal for the prepits may be supplied to the two light modulators 7 and 7a from the first signal generator 22 to form the optical disk for use in a so-called on-land recording system.

In the present embodiment, the radial pitch p of the identifier 48 is set to one half of the radial pitch P of the preformat. Where three or more optical paths are constructed, the radial pitch p of the identifier 48 may be less than one third of the diameter of the reproducing laser spot.

In the present embodiment, the two laser beams split by the beam splitter 52 are modulated. The gist of the present invention is not limited to the above but one laser beam transmitted from the light source 1 may be modulated and then it may be split into a plurality of laser beams by the beam splitter 52. In this case, the two-beam cutting of the preformat cannot be attained but the cutting of the optical disk shown in FIGS. 14A and 14B is attained.

A fifth embodiment of the present invention is now explained with reference to FIGS. 15 to 17. In the optical apparatus for the optical information recording medium of the fifth embodiment, record tracks of ROM data in a form of prepit train are preformed on the optical information recording medium, and RAM data can be recorded in an area between two adjacent record tracks. A light deflector is provided in an optical path extending from an acoustooptical element to an objective lens. Each time the ROM data necessary for recording or reproducing the RAM data is read, the light beam which has been focused to the record track of the ROM data is deflected to a record track to or from which the RAM data is to be recorded or reproduced.

Figure 15:
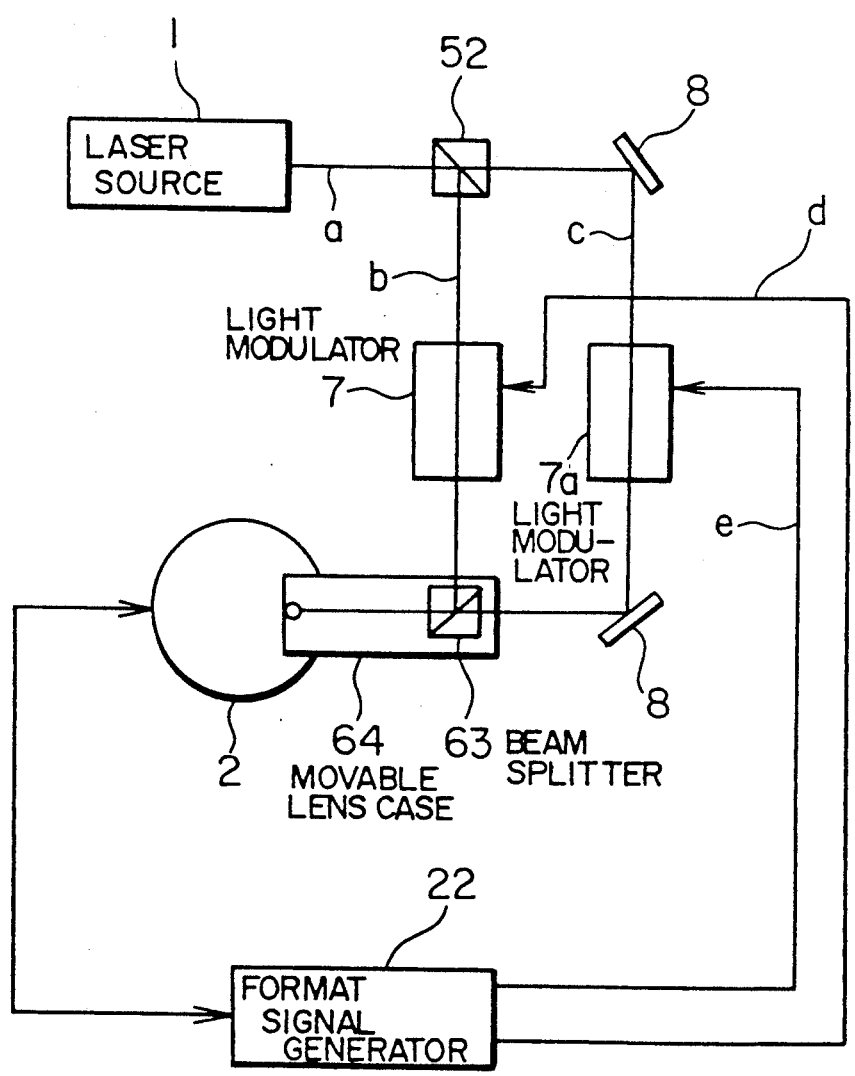
FIGS. 15 to 17 show a fifth embodiment of the present invention.

Referring to FIG. 15, a method and assembly for cutting the optical disk is illustrated including a laser light source 1 a beam splitter 52, a mirror 8, light modulators 7 and 7a, a movable lens case 64, a beam splitter 63, an optical disk 2 and a format signal generator 22.

A laser beam a emitted from the laser light source 1 is split into laser beams b and c by the beam splitter 52. The laser beam b is directed to the light modulator 7 and the laser beam c is reflected by the mirror 8 and directed to the light modulator 7a. On the other hand, the format signal generator 22 produces a mixed signal (ROM data signal) e of a preformat signal which comprises synchronization information and address information, and a data signal, and a grooving signal d for forming a pregroove. The light modulator 7 modulates the laser beam b with the pregrooving signal d, and the light modulator 7a modulates the laser beam c with the mixed signal e. The modulated laser beam b is reflected by the beam splitter 63 in the movable lens case 64, and the modulated laser beam c is reflected by the mirror 8 and passes through the beam splitter 63. Thus, the laser beams b and c are parallel to each other with a predetermined interval therebetween, and they are focused by a movable lens (not shown) and irradiated to the optical disk 2. The optical disk 2 are cut by the laser beams b and c so that the record tracks 65 of the ROM data in the form of prepit train and the pregroove 66 are formed in parallel to each other as shown in FIG. 17. The output timing of the preformat signal and the data signal from the format signal generator 22 is determined by the position of the movable lens (optical head) in the movable lens case 64 in accordance with a predetermined layout format of the preformat and the data on the optical disk.

In the CAV system, the rotation speed of the optical disk 2 is always kept constant. In the CLV system, the position of the movable lens on a radius of the optical disk 2 is detected and the rotation speed of the optical disk 2 is changed in accordance with the detected position so that the relative speed between the movable lens and the optical disk 2 is always kept constant, and an edge of the pulse of the mixed signal e is synchronized with a clock of a constant period to include time information.

Where it is not necessary to form the pregroove, the generation of the grooving signal d and the modulation of the laser beam by the grooving signal d are not necessary, and the beam splitters 52 and 63 and the light modulator 7 may be omitted. The formation of the pregroove and the recording of the ROM data may be attained by one laser beam, as is done in the prior art apparatus. When two or more pregrooves are to be formed between the record tracks of the ROM data, the laser beam a is split into three or more beams in FIG. 15 and two or more laser beams are modulated by the grooving signal d.

Figure 16:
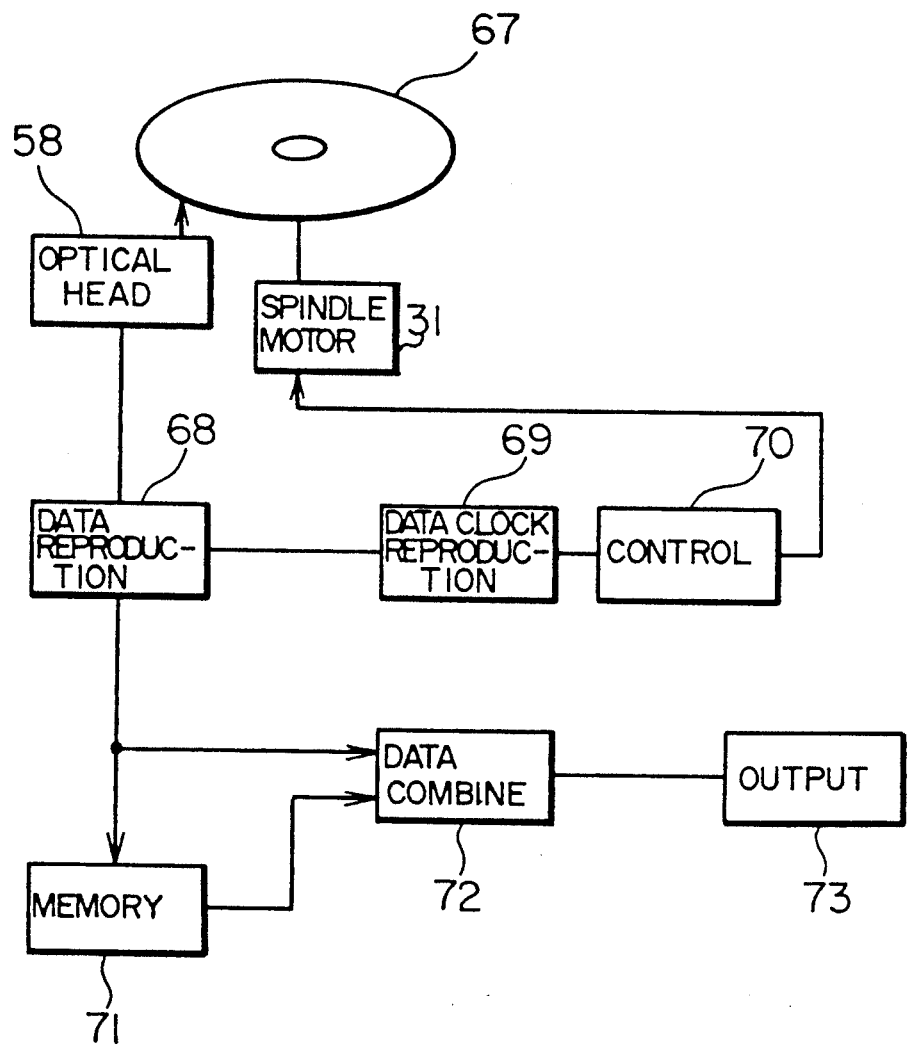
Figure 17:
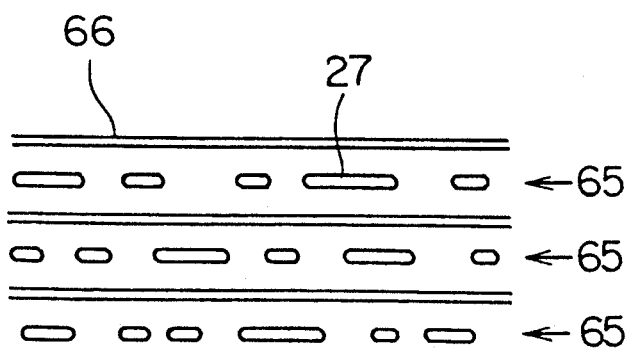

Referring to FIG. 16, one embodiment of the optical disk drive apparatus for the optical disk recording medium of the present invention in the CLV system is explained including an optical disk recording medium 67, an optical head 58, a data reproduction circuit 68, a data clock reproduction circuit 69, a control circuit 70, a spindle motor 31, a memory 71, a data combine circuit 72, and an output circuit 73.

The optical disk recording medium 67 is rotated by the spindle motor 31. Under this condition, the optical head 58 scans the record track of the ROM data of the optical disk recording medium 67. The reproduced output signal from the optical head 58 is supplied to the data reproduction circuit 68 where the ROM data is reproduced. The ROM data is then supplied to the data clock detection circuit 69 which detects the data clock which is the time information, from the edge of the bit pulse of the ROM data. The control circuit 70 detects the period or frequency of the data clock and controls the rotation speed of the spindle motor 31 such that the detected period or frequency reaches a predetermined value (equal to the period or frequency of the clock of the mixed signal e in FIG. 15). As a result, the relative speed between the optical head 58 and the optical disk recording medium 67 is kept constant irrespectively of the radial position of the optical head 58 on the optical disk recording medium 67.

Under this condition, the ROM data reproduced by the data reproduction circuit 68 is supplied to the output circuit 73 through the data combine circuit 72. As the desired ROM data is reproduced, the optical head 58 is displaced to an area between the record tracks of the ROM data to record or reproduce the RAM data. When the RAM data is to be reproduced, the RAM data is supplied from the data reproduction circuit 68 to the output circuit 73 through the combine circuit 72.

The control circuit 70 comprises a comparator for comparing the period or frequency of the data clock detected by the data clock detection circuit 69 with a reference, a time constant circuit for holding an output error voltage of the comparator, and a voltage controlled oscillator whose oscillation frequency is controlled by the output voltage of the time constant circuit. The spindle motor 31 is rotated by the output signal of the voltage controlled oscillator. The above reference is set to the period or frequency of the desired data clock, and the rotation speed of the optical disk recording medium 67 is set such that the period or frequency of the data clock detected by the data clock detection circuit 69 reaches the desired value. In the recording of the RAM data after the reproduction of the ROM data, the rotation speed of the optical disk recording medium 67 is held at the rotation speed in the reproduction of the ROM data, by the time constant circuit. In the reproduction mode, the rotation speed is controlled by the period or frequency detected from the RAM data or ROM data.

Where ROM data and RAM data are to be combined to produce data having a desired content, the reproduced ROM data is temporarily stored in the memory 71, and the ROM data is read when the RAM data is reproduced and they are combined in the data combine circuit 72. For example, where the ROM data is an accompaniment of a song and the RAM data is a song which a user sings in harmonization with the accompaniment, the ROM data is reproduced from the optical disk recording medium 67 and temporarily stored in the memory 71, and it is read and supplied to the output circuit 73 through the combine circuit 72 to play the accompaniment, and the song which the user sings in harmonization with the accompaniment is recorded in the optical disk recording medium 67 as the RAM data. When the song is to be reproduced, the ROM data which contains the accompaniment is reproduced from the optical disk recording medium 67 and stored in the memory 71. Then, the ROM data is read while the RAM data is reproduced, and they are combined by the data combine circuit 72. In this manner, the song of the user is reproduced in harmonization with the accompaniment.

Since the ROM data and the RAM data are recorded on the same record area of the optical disk recording medium, the record tracks for the ROM data and the record tracks for the RAM data should be discriminated. To this end, a flag may be included in one of the preformat record area of the ROM data record track and the RAM data record track. Alternatively, different synchronization signals which are marks to indicate the start point of data may be used for the ROM data and the RAM data to discriminate them from each other.

In the present embodiment, a single beam is used to reproduce the ROM data and record and reproduce the RAM data. Alternatively, multiple beams may be used to use one of the beams for the reproduction of the ROM data and other beams for the recording and reproduction of the RAM data. In this case, the reproduction of only the ROM data, the reproduction of only the RAM data as well as the reproduction of the ROM data and the recording and reproduction of the RAM data can be attained in parallel. By independently deflecting the beams by separate deflection means (mirrors or AO deflectors), each beam can be set at the start point of reproduction of the ROM data or the start point of recording or reproduction of the RAM data. Thus, no problem occurs even if there is a deviation between the start positions of the ROM data and the RAM data (so long as the tracks are close to each other) or there is a deviation between the reproduction period of the ROM data and the recording/reproduction period of the RAM data. Where a mirror is used as the deflection means, the drive response is as fast as 1 KHz and the seek speed is one order faster (several mseconds) than that of a hard disk. Accordingly, the beam positioning for reproducing the ROM data and recording and reproducing the RAM data is carried out rapidly and the ROM data can be reproduced and the RAM data can be recorded or reproduced essentially simultaneously with the operation by the user. When the beam is deflected by the mirror, the range of deflection is limited to approximately ±50 tracks namely approximately 100 tracks. However, since the 100 tracks has a capacity of 30 M bytes, it corresponds to a capacity of a small size hard disk. Accordingly, a sufficient amount of ROM data and RAM data can be reproduced or recorded by the deflection by the mirror. When the beam is to be positioned over 100 tracks, the track is seeked as was done in the prior art apparatus, and when the desired track is reached, the deflection by the mirror is used to record or reproduce the data.

In the optical apparatus for the optical information recording medium of the second to fifth embodiments, the light modulator comprises two acoustooptical elements arranged such that the directions of travel of the supersonic waves are crossed to each other. Alternatively, the light modulator may comprise one acoustooptical element.

As described hereinabove, in accordance with the optical apparatus for the optical information recording medium of the present invention, the deformation of the sectional shape of the light beam caused by the first acoustooptical element is cancelled by the second acoustooptical element so that the sectional shape of the light beam irradiated to the optical information recording medium has a circular section. When the present invention is applied to the optical disk exposure apparatus, an exact uneven signal pattern can be formed. When the present invention is applied to a recording and reproducing apparatus, exact pits are formed and the crosstalk due to the deformation of the shape of the laser spot is prevented and the C/N ratio of the reproduced signal is improved.

The invention being thus described, it will be obvious that the same may be varied in many ways. Such variations are not to be regarded as a departure form the spirit and scope of the invention, and all such modifications as would be obvious to one skilled in the art are intended to be included within the scope of the following claims.

What is claimed is:

1. An optical apparatus for an optical information recording medium comprising:
   an optical information recording medium;
   a beam deflector arranged in an optical path extending from a light source through a light modulator to an objective lens for deflecting a modulated light beam from said light modulator when a wobbling pit is to be recorded, said beam deflector being composed of two acoustooptical elements which are arranged in such a manner that directions of travel of supersonic waves generated in said acoustooptical elements are crossed to each other; and
   light intensity control means for increasing an intensity of said modulated light beam exposed to said optical information recording medium in synchronism with the beam deflection when the wobbling pit is recorded.

2. An optical apparatus for an optical information recording medium according to claim 1, wherein said optical information recording medium is a master optical disk, a beam splitter for splitting the light beam emitted from the light source into a plurality of beams is provided in said optical path extending from the light source to the objective lens, and a beam shifter for adjusting an interval of a plurality of beam spots irradiated to different radial positions on said optical disk to no more than one half of a radial pitch of a preformat is arranged in at least one of exit optical paths of said beam splitter.

3. An optical apparatus for an optical information recording medium according to claim 1, wherein said optical information recording medium is a master optical disk, a beam splitter for splitting the light beam emitted from the light source into a plurality of beams is arranged in said optical path extending from the light source to the objective lens, one of two light beams adjacently irradiated onto the optical disk through the objective lens is modulated by ROM data and the other is modulated by RAM data.

4. An optical apparatus for an optical information recording medium according to claim 1, wherein said optical information recording medium is an optical disk medium having record tracks of ROM data in a form of prepit train preformed thereon and RAM data can be recorded in an area between two adjacent record tracks, and each time the ROM data necessary to record and/or reproduce the RAM data is read, the light beam which has been focused to the record track of the ROM data is deflected by said beam deflector, in accordance with the ROM data, to a record track to or from which the RAM data is to be recorded or reproduced.

5. An optical apparatus for an optical information recording medium according to claim 1, wherein said optical information recording medium is an optical disk, and said optical disk is rotated at a constant rotation speed.

6. An optical apparatus for an optical information recording medium according to claim 1 wherein said optical information recording medium is an optical disk, and said optical disk is rotated at a constant linear velocity.

7. An optical apparatus for an optical information recording medium according to claim 1, wherein said optical information recording medium is an optical card.

8. An optical apparatus for an optical information recording medium comprising:
   a light source;
   an acoustooptical element for modulating a light beam emitted from the light source; and
   an objective lens for focusing the light beam emitted from the acoustooptical element to the optical information recording medium;
   two such acoustooptical elements being provided in an optical path extending from the light source to the objective lens and arranged such that directions of travel of supersonic waves generated in the respective acoustooptical elements are crossed to each other.

9. An optical apparatus for an optical information recording medium comprising:
an optical disk as the optical information recording medium;
a spindle motor for rotating said optical disk;
an acoustooptical beam deflector arranged in an optical path extending from a light source through a light modulator to an objective lens, said acoustooptical beam deflector being composed of two acoustooptical elements which are arranged in such a manner that the directions of travel of supersonic waves generated in the acoustooptical elements are orthogonal to each other; and
means for driving said acoustooptical beam deflector such that a locus of a light spot irradiated to said optical disk draws concentric circles when an optical system including the objective lens is moved at a constant speed in a radial direction of said optical disk while said optical disk is rotated.

10. An optical apparatus for an optical information recording medium comprising:
an optical disk as the optical information recording medium;
a spindle motor for rotating said optical disk;
an acoustooptical beam deflector arranged in an optical path extending from a light source through a light modulator to an objective lens;
means for driving said acoustooptical beam deflector by applying a saw tooth shaped driving signal thereto such that a locus of a light spot irradiated to said optical disk draws concentric circles when an optical system including the objective lens is moved at a constant speed in a radial direction of said optical disk while said optical disk is rotated, said driving means including a voltage controlled oscillator and driving amplifier, a voltage signal varying in synchronism with an encoder output of said spindle motor being applied to said voltage controlled oscillator, further and
an input circuit which includes a memory circuit and a D/A converter, whereby a linearity of a voltage-frequency characteristic of said voltage controlled oscillator is improved by data prestored in said memory circuit.

11. An optical apparatus for an optical information recording medium according to claim 10, wherein a plurality of acoustooptical deflectors for independently deflecting two beams are provided and said plurality of acoustooptical deflectors are alternately driven each time the optical disk makes one revolution.

12. An optical apparatus for an optical information recording medium according to claim 10, wherein said acoustooptical deflectors are activated and deactivated in synchronism with an encoder signal of said spindle motor so that non-irradiation area is formed in a portion of a locus of the light spot drawn as concentric and continuous tracks on the optical disk, and the non-irradiation area is used as a portion of an optical disk format.

13. An optical apparatus for an optical information recording medium according to claim 10, wherein a level of a driving RF signal applied to said acoustooptical deflector is controlled such that a level of a light output emitted from the acoustooptical deflector is kept constant irrespectively of a frequency of the driving RF signal applied to the acoustooptical deflector.

14. An optical apparatus for an optical information recording medium according to claim 13, wherein the means for controlling the level of the driving RF signal applied to the acoustooptical deflector comprises monitor means for monitoring a portion of the light output of the acoustooptical deflector and a feedback circuit for negatively feeding back to at least one of frequency and level of the driving RF signal.

15. An optical apparatus for an optical information recording medium according to claim 9, wherein said driving means for said acoustooptical deflectors comprises a voltage controlled oscillator and a driving amplifier, a voltage signal varying in synchronism with an encoder output of said spindle motor being applied to said voltage controlled oscillator.

16. An optical apparatus for an optical information recording medium according to claim 9, wherein a plurality of acoustooptical deflectors for independently deflecting two beams are provided and said plurality of acoustooptical deflectors are alternately driven each time the optical disk makes one revolution.

17. An optical apparatus for an optical information recording medium according to claim 9, wherein said acoustooptical deflectors are activated and deactivated in synchronism with an encoder signal of said spindle motor so that non-irradiation area is formed in a portion of a locus of the light spot drawn as concentric and continuous tracks on the optical disk, and the non-irradiation area is used as a portion of an optical disk format.

18. An optical apparatus for an optical information recording medium according to claim 9, wherein a level of a driving RF signal applied to said acoustooptical deflector is controlled such that a level of a light output emitted from the acoustooptical deflector is kept constant irrespectively of a frequency of the driving RF signal applied to the acoustooptical deflector.

19. An optical apparatus for an optical information recording medium according to claim 14, wherein the means for controlling the level of the driving RF signal applied to the acoustooptical deflector comprises monitor means for monitoring a portion of the light output of the acoustooptical deflector and a feedback circuit for negatively feeding back to at least one of frequency and level of the driving RF signal.

20. An optical apparatus for an optical information recording medium according to claim 9, wherein said optical information recording medium is an optical disk, a beam splitter for splitting the light beam emitted from the light source into a plurality of beams is provided in an optical path extending from the light source to the objective lens, and a beam shifter for adjusting an interval of a plurality of beam spots irradiated to different radial positions on the optical disk to no more than one half of a radial pitch of a preformat is arranged in at least one of exit optical paths of the beam splitter.

21. An optical apparatus for an optical information recording medium according to claim 9, wherein said optical information recording medium is an optical disk, a beam splitter for splitting the light beam emitted from the light source into a plurality of beams is arranged in an optical path extending from the light source to the objective lens, one of two light beams adjacently irradiated onto the optical disk through the objective lens is modulated by ROM data and the other is modulated by RAM data.

22. An optical apparatus for an optical information recording medium according to claim 9, wherein said optical information recording medium is an optical disk medium having record tracks of ROM data in a form of prepit train performed thereon and RAM data which can be recorded in an area between two adjacent records tracks, such that each time the ROM data necessary to record and/or reproduce the RAM data is read, the light beam which has been focused to the record track of the ROM data is deflected by said beam deflector, in accordance with the ROM data, to a record track to or from which the RAM data is to be recorded or reproduced.

23. An optical apparatus for an optical information recording medium according to claim 9, wherein said optical information recording medium is an optical disk, and said optical disk is rotated at a constant rotation speed.

24. An optical apparatus for an optical information recording medium according to claim 9, wherein said optical information recording medium is an optical disk, and said optical disk is rotated at a constant linear velocity.

25. An optical apparatus for an optical information recording medium according to claim 9, wherein said optical information recording medium is an optical card.

* * * * *